US012770772B2

(12) United States Patent
Kiyonaga et al.

(10) Patent No.: US 12,770,772 B2
(45) Date of Patent: Oct. 20, 2026

(54) COIL DEVICE AND POWER CONVERSION DEVICE

(71) Applicant: Mitsubishi Electric Corporation, Tokyo (JP)

(72) Inventors: Hiroyuki Kiyonaga, Tokyo (JP); Kenta Fujii, Tokyo (JP); Takashi Kumagai, Tokyo (JP); Tomohito Fukuda, Tokyo (JP); Koji Nakajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 573 days.

(21) Appl. No.: 18/553,581

(22) PCT Filed: May 19, 2022

(86) PCT No.: PCT/JP2022/020815
§ 371 (c)(1),
(2) Date: Oct. 2, 2023

(87) PCT Pub. No.: WO2022/255115
PCT Pub. Date: Dec. 8, 2022

(65) Prior Publication Data

US 2024/0177914 A1 May 30, 2024

(30) Foreign Application Priority Data

Jun. 3, 2021 (JP) ................................ 2021-093693

(51) Int. Cl.
*H01F 27/22* (2006.01)
*H01F 27/28* (2006.01)
*H02M 3/00* (2006.01)

(52) U.S. Cl.
CPC ......... *H01F 27/22* (2013.01); *H01F 27/2876* (2013.01); *H02M 3/003* (2021.05)

(58) Field of Classification Search
CPC ................. H01F 27/22; H01F 27/2876; H01F 2027/2814; H01F 27/2804; H01F 27/306; H02M 3/003
(Continued)

(56) References Cited

U.S. PATENT DOCUMENTS 10,916,367 B2 * 2/2021 Fukui ..................... H05K 1/165
11,206,729 B2 * 12/2021 Sato ........................ H02M 1/44
(Continued)

FOREIGN PATENT DOCUMENTS

JP 2013168401 A 8/2013
JP 2014093405 A 5/2014
(Continued)

OTHER PUBLICATIONS

International Search Report (PCT/ISA/210) with translation and Written Opinion (PCT/ISA/237) mailed on Aug. 16, 2022, by the Japanese Patent Office as the International Searching Authority for International Application No. PCT/JP2022/020815. (9 pages).

*Primary Examiner* — Tuyen T Nguyen
(74) *Attorney, Agent, or Firm* — Buchanan Ingersoll & Rooney PC

(57) ABSTRACT

A coil device includes a core having a loop-shaped magnetic path and a first winding part. The first winding part is wound around the core so as to pass through an inner region of the core surrounded by the core. In the inner region of the core and an outer region of the core, a metal base substrate in which a coil pattern is formed with an insulating layer interposed on a metal base body is disposed. A cooling body is thermally bonded to a side of the metal base body opposite to a side where the insulating layer and the coil pattern are formed. The first winding part includes the coil pattern.

20 Claims, 26 Drawing Sheets

(58) Field of Classification Search
USPC .............. 336/65, 83, 200, 232; 361/760–780
See application file for complete search history.

(56) References Cited

U.S. PATENT DOCUMENTS

| | | | |
|---|---|---|---|
| 2002/0163818 | A1 | 11/2002 | Green et al. |
| 2016/0035481 | A1 | 2/2016 | Hachiya et al. |

FOREIGN PATENT DOCUMENTS

| | | | | | |
|---|---|---|---|---|---|
| JP | 2014199909 | A | | 10/2014 | |
| JP | 2014216373 | A | | 11/2014 | |
| JP | 2020161725 | A | | 10/2020 | |
| WO | 2014141670 | A1 | | 9/2014 | |
| WO | WO-2024116850 | A1 | * | 6/2024 | ............. H01F 27/26 |

* cited by examiner

COIL DEVICE AND POWER CONVERSION DEVICE

TECHNICAL FIELD

The present disclosure relates to a coil device and a power conversion device.

BACKGROUND ART

For example, a smoothing reactor and a coil device such as a transformer is mounted on a power conversion device such as a DC-DC converter. A coil device mounted on a power conversion device includes a coil and a core. The core has a function of forming a magnetic path that is a path of lines of magnetic force generated by a current flowing through the coil. In the power conversion device, a DC current or an AC voltage is applied to the coil of the coil device.

By setting the frequency of the AC voltage to a high frequency, it is possible to miniaturize the core and reduce the number of windings (the number of turns) of the coil and contribute to the miniaturization of the coil device. In recent years, in order to miniaturize a coil device and a power conversion device on which the coil device is mounted, for example, a switching element capable of coping with a high switching frequency of 1 kHz or more is applied as a switching element mounted on the power conversion device.

Heat generated by energization of the coil device roughly includes Joule heat generated in the coil and heat generated in the core. The Joule heat increases in inverse proportion to the sectional area of a wiring used as the coil. Therefore, when a wiring having a small sectional area is applied in order to miniaturize the coil device, the Joule heat generated in the coil device increases.

In addition, when an alternating current flows, the current flows only near the surface of the wiring due to the skin effect, and thus, the electric resistance value of the coil device increases. When the frequency of the alternating current flowing through the wiring increases, the electric resistance value monotonously increases.

Therefore, as the frequency of the AC voltage applied to the coil device is set to a higher value in order to miniaturize the coil device, the electric resistance value of the wiring of the coil device increases due to the skin effect, and the Joule heat generated in the coil device increases.

As a result, in order to suppress an increase in the temperature of the coil device due to the Joule heat generated in the coil device or the like so as to be lower than or equal to an allowable temperature, the coil device is required to enhance heat dissipation. That is, in order to miniaturize the coil device, the heat dissipation of the coil device is required to be improved. In the coil device proposed in PTL 1, in particular, a method of dissipating heat generated from the coil in a region inside the core via a printed circuit board and the coil has been proposed.

CITATION LIST

Patent Literature

PTL 1: WO2014/141670A1

SUMMARY OF INVENTION

Technical Problem

As described above, in order to miniaturize the coil device, the heat dissipation of the coil device is required to be enhanced.

The present disclosure has been made as a part of such development, and one object of the present disclosure is to provide a coil device capable of improving heat dissipation, and another object of the present disclosure is to provide a power conversion device to which such a coil device is applied.

Solution to Problem

A coil device according to the present disclosure is a coil device having one or more coil units. The one or more coil units include a core and a first winding part. The core has one or more loop-shaped magnetic paths. The first winding part is wound around the core so as to pass through an inner region of the core surrounded by the core. A metal base substrate in which a coil pattern is formed with an insulating layer interposed on a metal base body is disposed in the inner region of the core and an outer region of the core. A first through hole through which the core passes is formed in the metal base substrate. A cooling body is thermally bonded to a side of the metal base body opposite to a side where the insulating layer and the coil pattern are formed. The first winding part includes the coil pattern.

A power conversion device according to the present disclosure includes the coil device described above.

Advantageous Effects of Invention

In the coil device according to the present disclosure, heat generated in a portion of the first winding part located in the outer region of the core is dissipated to the cooling body via the insulating layer and the metal base body. Heat generated in a portion of the first winding part located in the inner region of the core is also dissipated to the cooling body via the insulating layer and the metal base body. As a result, the heat generated in the portion of the first winding part located in the inner region of the core can be dissipated to the cooling body to the same extent as the heat generated in the portion of the first winding part located in the outer region of the core. As a result, the heat dissipation of the coil device can be improved.

The coil device according to the present disclosure, provided with the coil device described above, the heat dissipation can be improved.

DESCRIPTION OF EMBODIMENTS

Figure 1:
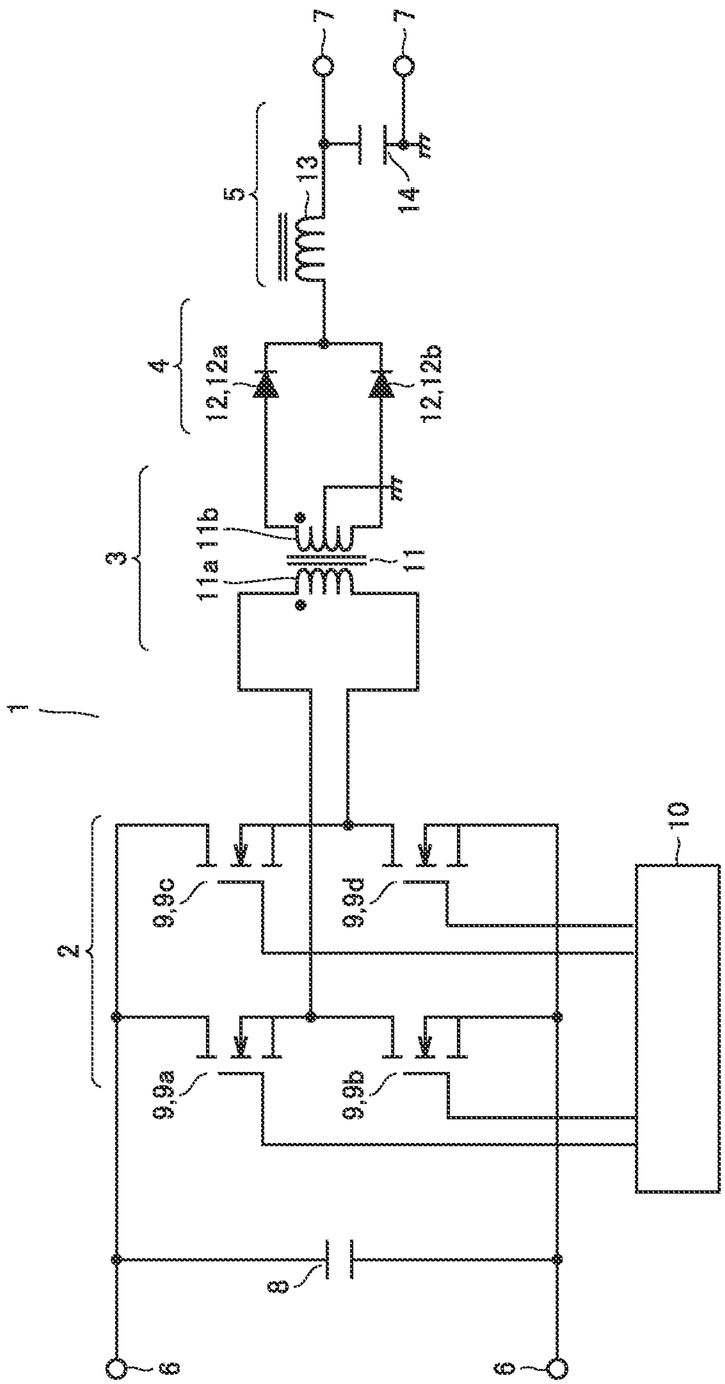
FIG. 1 is a circuit diagram illustrating an example of a power conversion device to which a coil device according to each embodiment is applied.

First, a DC-DC converter will be described as an example of a power conversion device including a coil device. FIG. 1 illustrates an example of a circuit diagram of the DC-DC converter. The DC-DC converter is mounted on, for example, an electric vehicle. The DC-DC converter has a function of charging a lead-acid battery by converting an input voltage of a lithium ion battery of about 100 V to 300 V into a voltage of 12 V to 15 V and outputting the converted voltage.

As illustrated in FIG. 1, the DC-DC converter as a power conversion device 1 includes an inverter circuit unit 2, a transformation unit 3, a rectifier circuit unit 4, a smoothing circuit unit 5, an input terminal 6, an input capacitor 8, a control circuit unit 10, and an output terminal 7.

Inverter circuit unit 2 includes a switching element 9, and here, includes four switching elements 9*a*, 9*b*, 9*c*, and 9*d*. As switching element 9, for example, a power semiconductor element such as a MOS transistor metal oxide semiconductor field effect transistor (MOSFET)) or an insulated gate bipolar transistor (IGBT) is applied. Switching operation of four switching elements 9 is controlled by control circuit unit 10.

Transformation unit 3 includes a transformer 11 having a primary winding 11*a* and a secondary winding 11*b*. Rectifier circuit unit 4 includes a rectifier element 12, and here, includes two rectifier elements 12*a* and 12*b*. As rectifier element 12, for example, a power semiconductor element such as a diode, a MOS transistor, or a thyristor is applied. Smoothing circuit unit 5 includes a smoothing reactor 13 and a smoothing capacitor 14.

In the DC-DC converter as power conversion device 1, a DC voltage input from input terminal 6 is converted into an AC voltage by controlling the switching operation of each of four switching elements 9 in inverter circuit unit 2 by control circuit unit 10.

In transformation unit 3, the AC voltage converted in inverter circuit unit 2 is converted into an arbitrary voltage by transformer 11. The voltage to be converted is determined by a winding ratio between primary winding 11*a* and a secondary winding 11*b* in transformer 11. Note that transformer 11 electrically insulates input terminal 6 from output terminal 7.

In rectifier circuit unit 4, the AC voltage supplied from transformation unit 3 is converted into a DC voltage again by rectifier element 12. In smoothing circuit unit 5, the DC voltage converted by rectifier circuit unit 4 is smoothed by smoothing reactor 13 and smoothing capacitor 14. As a result, an output voltage output from output terminal 7 is stabilized.

In power conversion device 1 illustrated in FIG. 1, transformer 11 and smoothing reactor 13 are coil devices having a relatively high heating value. It is necessary to dissipate heat generated in transformer 11 and smoothing reactor 13 to lower the temperature of each of transformer 11 and the smoothing reactor to, for example, about 100° C. to 120° C. or less, which is lower than or equal to an allowable temperature. In each embodiment, a structure for dissipating heat from a coil device including one or more coil units will be specifically described.

First Embodiment

Figure 2:
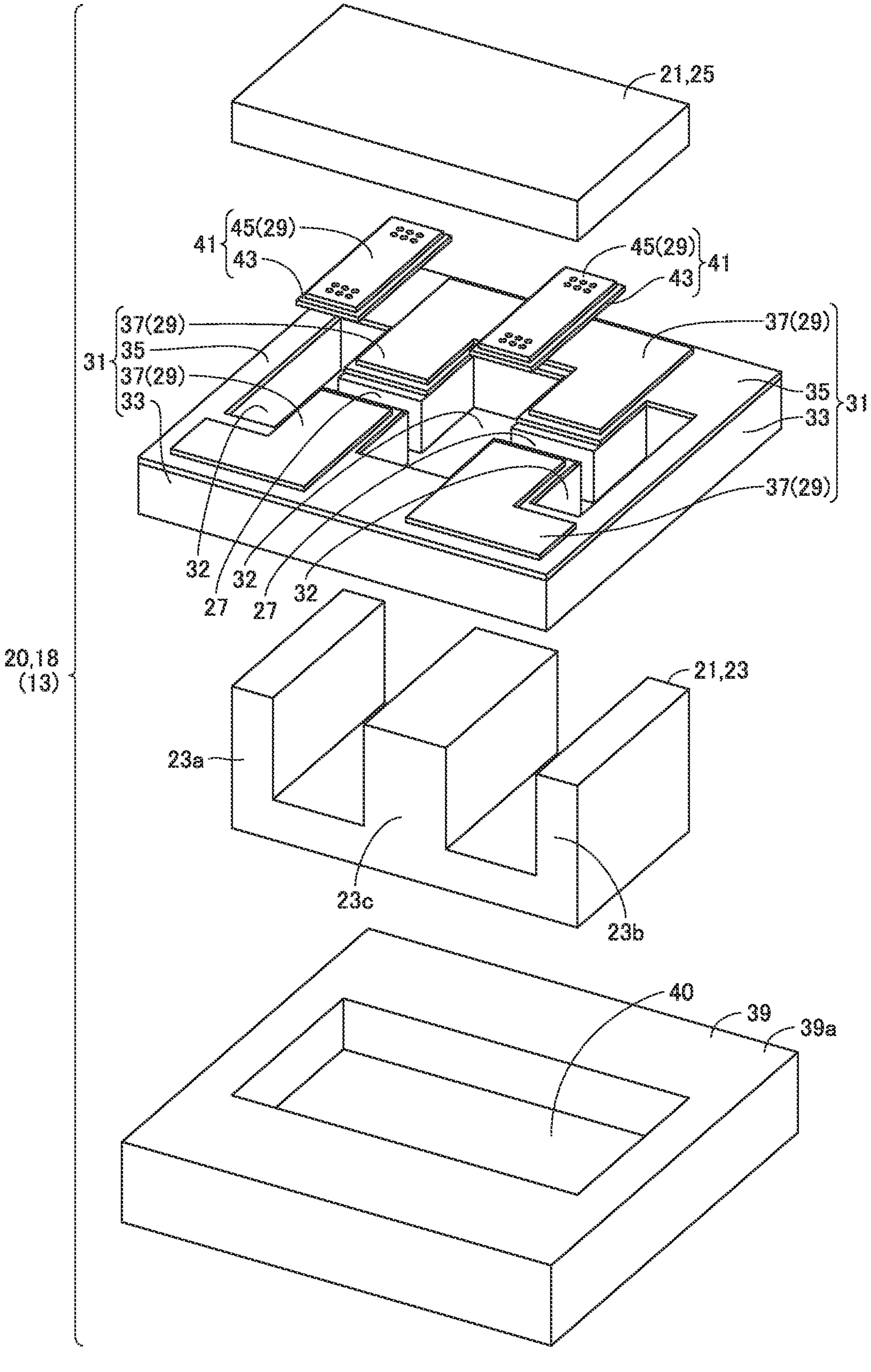
FIG. 2 is an exploded perspective view illustrating an example of a coil device according to a first embodiment.
Figure 3:
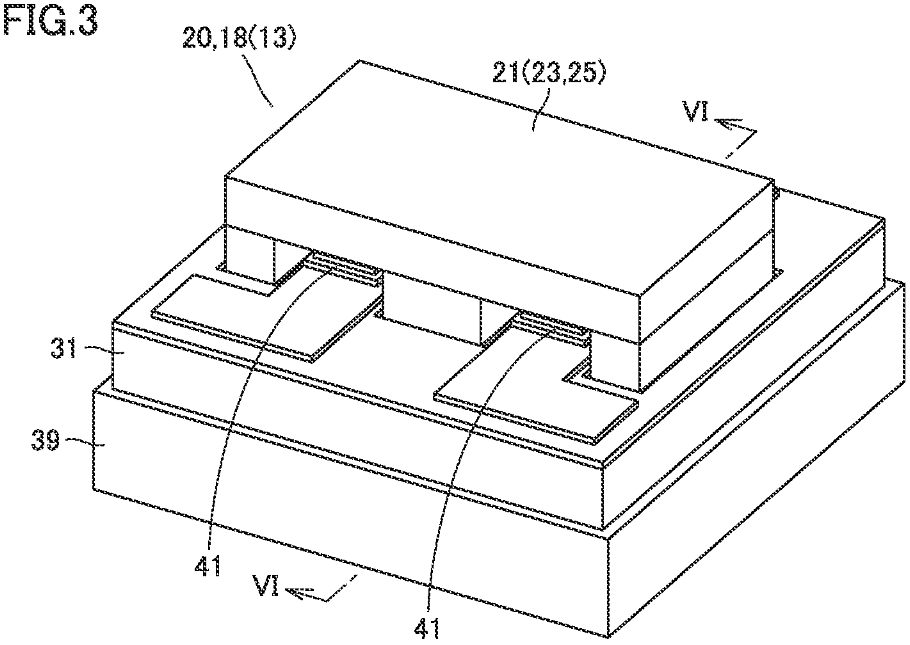
FIG. 3 is a perspective view of the coil device illustrated in FIG. 2 in the first embodiment.

In a first embodiment, a smoothing reactor will be described as an example of a coil device. As illustrated in FIGS. 2 and 3, a coil device 20 includes one coil unit 18. Smoothing reactor 13 as coil device 20 is formed by a core 21 having one or more loop-shaped magnetic paths and a first winding part 29 wound around core 21. As described later, first winding part 29 includes a coil pattern 37 in a metal base substrate 31 and a wiring body 45 in a wiring member 41.

The structure of coil device 20 will be specifically described. Smoothing reactor 13 includes metal base substrate 31, wiring member 41, core 21, and a cooling body 39. Metal base substrate 31 includes a metal base body 33, an insulating layer 35, and coil pattern 37. Core 21 includes an E-shaped core 23 and an I-shaped core 25. E-shaped core 23 has a leg 23*a*, a leg 23*b*, and a leg 23*c*. I-shaped core 25 abuts on leg 23*a*, leg 23*b*, and leg 23*c* to form core 21 having a loop-shaped magnetic path. E-shaped core 23 and I-shaped core 25 are fixed by an adhesive (not illustrated).

As core 21 (E-shaped core 23 and I-shaped core 25), for example, a ferrite core such as a manganese-zinc (Mn—Zn)-based ferrite core or a nickel-zinc (Ni—Zn)-based ferrite core is applied. Alternatively, an amorphous core or an iron dust core may be applied as core 21.

Note that core 21 has a structure in which E-shaped core 23 and I-shaped core 25 are combined. However, as long as core 21 having a loop-shaped magnetic path can be configured by combining E-shaped core and I-shaped core, core 21 is not limited to E-shaped core 23 and I-shaped core 25, and may be, for example, a core in which two U-shaped cores are combined. Alternatively, core 21 may be a core obtained by combining two E-shaped cores. Furthermore, core 21 may be a core obtained by combining a T-shaped core and a U-shaped core.

Figure 4:
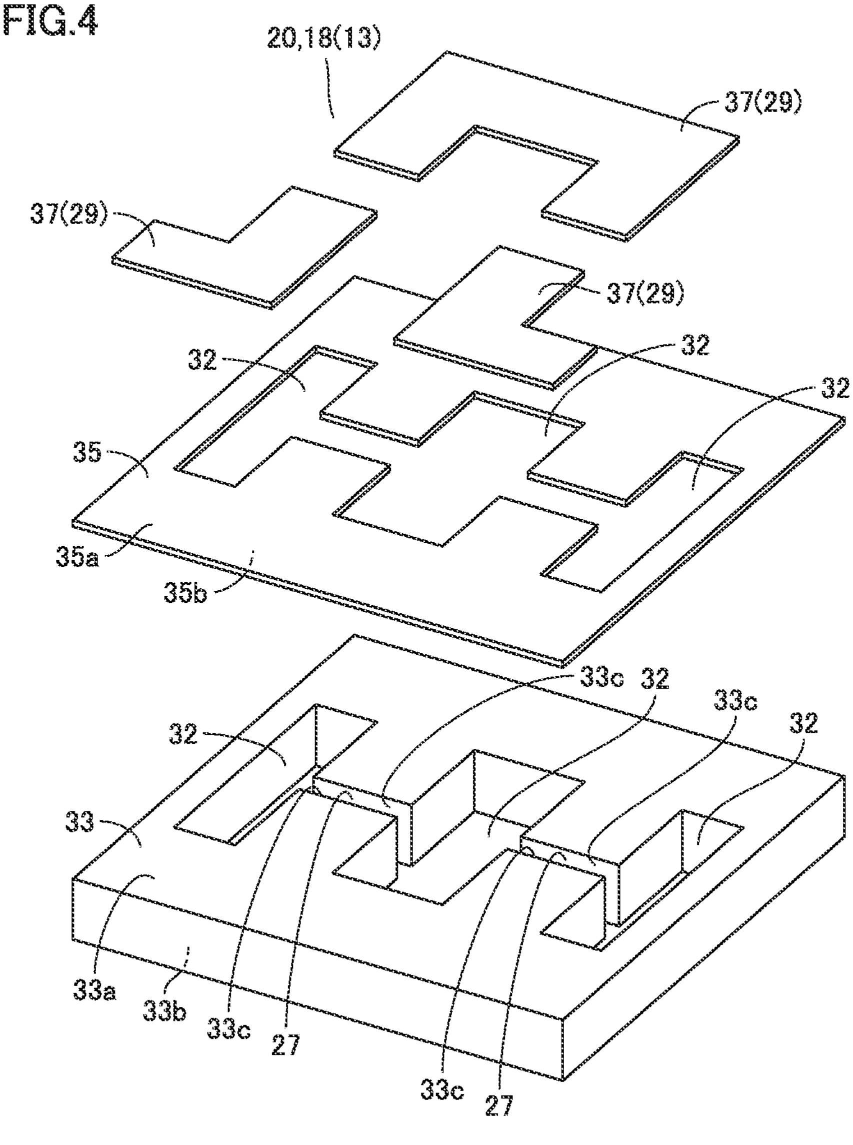
FIG. 4 is an exploded perspective view illustrating a structure of a metal base substrate in the coil device in the first embodiment.

The structure of metal base substrate 31 and the like will be described in more detail. As illustrated in FIGS. 2 and 4, in metal base substrate 31, coil pattern 37 is disposed on metal base body 33 with insulating layer 35 interposed therebetween.

Metal base body 33 has a thermal conductivity of 1.0 W/(m·K) or more, preferably 10.0 W/(m·K) or more, and more preferably 100.0 W/(m·K) or more. Metal base body 33 includes, for example, a metal material such as copper, iron, aluminum, an iron alloy, or an aluminum alloy. Metal base body 33 has a first main surface 33*a* and a second main surface 33*b*. First main surface 33*a* faces insulating layer 35. Second main surface 33*b* faces cooling body 39.

In metal base body 33, through holes 32 as first insertion holes through which legs 23*a*, 23*b*, and 23*c* of E-shaped core 23 are respectively inserted are formed. A slit 27 is formed in a portion of metal base body 33 located between through hole 32 through which leg 23*a* is inserted and through hole 32 through which leg 23*c* is inserted. Slit 27 is formed in a portion located in an inner region of core 21 surrounded by E-shaped core 23 and I-shaped core 25 in metal base body 33. In slit 27, end surfaces 33*c* of metal base body 33 are exposed so as to face each other.

The portion of metal base body 33 located so as to surround a periphery of leg 23*c* of E-shaped core 23 around which coil pattern 37 is wound is physically and electrically divided by slit 27. Assuming that the distance between one end surface 33*c* and other end surface 33*c* is the width of slit 27, the width of slit 27 is set within a range between about 0.1 mm or more and 10 mm or less, for example.

Slit 27 has a function of not forming a short coil in metal base body 33. By not forming a short coil in metal base body 33, coil device 20 can function as coil device 20 (smoothing reactor 13).

Figure 5:
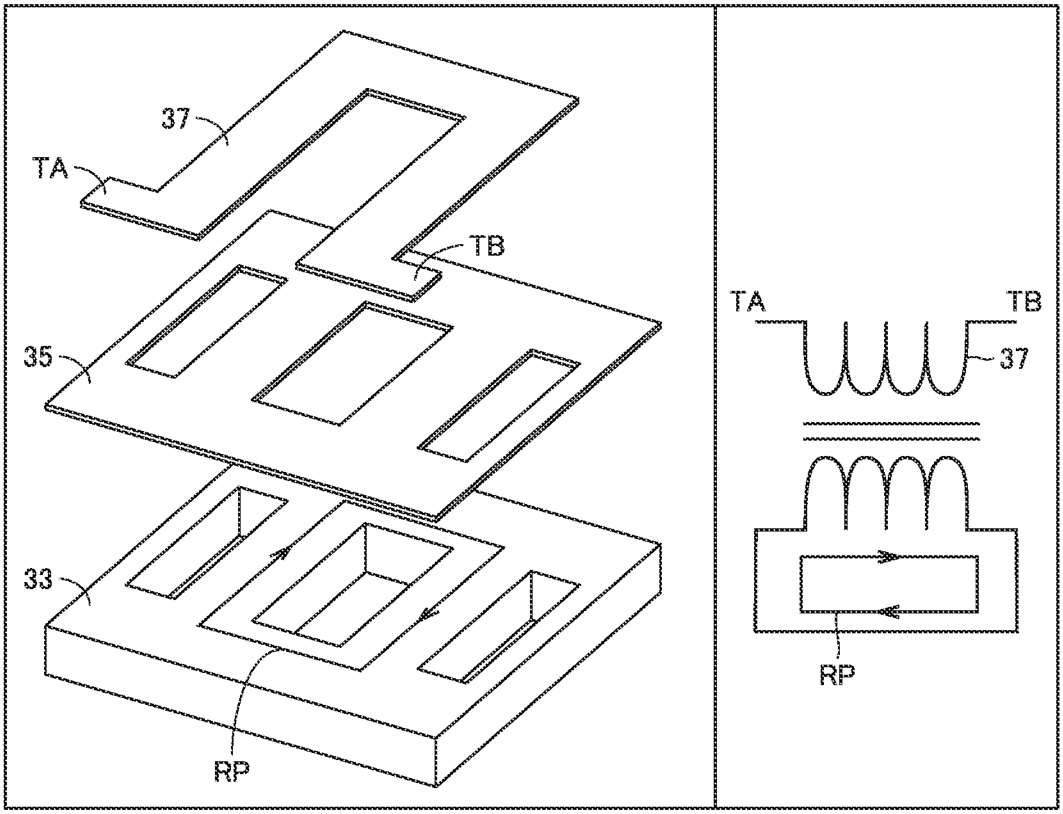
FIG. 5 is a diagram for describing a reason for providing a slit in the metal base substrate in the first embodiment.

The above will be described. As illustrated in the left diagram in FIG. 5, in a case where the slit is not provided in metal base body 33, the portion of metal base body 33 located so as to surround the periphery of leg 23*c* (see FIG. 2) around which coil pattern 37 is wound is physically and electrically connected.

Therefore, when a current flows between a terminal TA and a terminal TB in coil pattern 37, induced current RP flows through the portion of metal base body 33 in a loop shape. As illustrated in the right diagram in FIG. 5, induced current RP becomes a short coil magnetically coupled to coil pattern 37 in metal base body 33. As a result, desired performance as coil device 20 (smoothing reactor 13) cannot be exhibited.

As illustrated in FIGS. 2 and 4, insulating layer 35 has a first main surface 35*a* and a second main surface 35*b*. Second main surface 35*b* is disposed so as to be in contact with substantially all over first main surface 33*a* of metal base body 33. Insulating layer 35 has electrical insulation. Insulating layer 35 includes, for example, an epoxy resin, a glass fiber-reinforced epoxy resin, a polyimide resin, or the like. In addition, a thermally conductive filler may be mixed into the epoxy resin or the like in order to improve thermal conductivity.

The thickness of insulating layer 35 is preferably as thin as possible within a range that does not affect electrical insulation or manufacturability. The thickness of insulating layer 35 is set to, for example, a thickness of about 1 μm or more and 2000 μm or less. Preferably, the thickness of insulating layer 35 is set to a thickness of about 1 μm or more and 200 μm or less.

Coil pattern 37 is disposed on first main surface 35*a* of insulating layer 35. In insulating layer 35, through holes 32 through which legs 23*a*, 23*b*, and 23*c* of E-shaped core 23 are respectively inserted are formed. Note that insulating layer 35 may be a pattern extending over slit 27 formed in metal base body 33. In this case, it is preferable to secure the strength of insulating layer 35.

Coil pattern 37 is formed in close contact with first main surface 35*a* of insulating layer 35. A wiring pattern (not illustrated) other than coil pattern 37 may be formed on first main surface 35*a* of insulating layer 35. The thickness of coil pattern 37 and the like is, for example, about 1 μm or more and 2000 μm or less. Coil pattern 37 and the like include, for example, copper, nickel, gold, aluminum, silver, tin, or the like. Alternatively, coil pattern 37 and the like may include an alloy containing these metals.

Insulating layer 35 is disposed so as to be in contact with substantially all over first main surface 33*a* of metal base body 33. Heat generated in coil pattern 37 is dissipated to metal base body 33 via insulating layer 35. By setting the thickness of insulating layer 35 as thin as possible within a range that does not affect both the electrical insulation and the manufacturability, the heat dissipation of a heat dissipation path can be enhanced.

Figure 6:
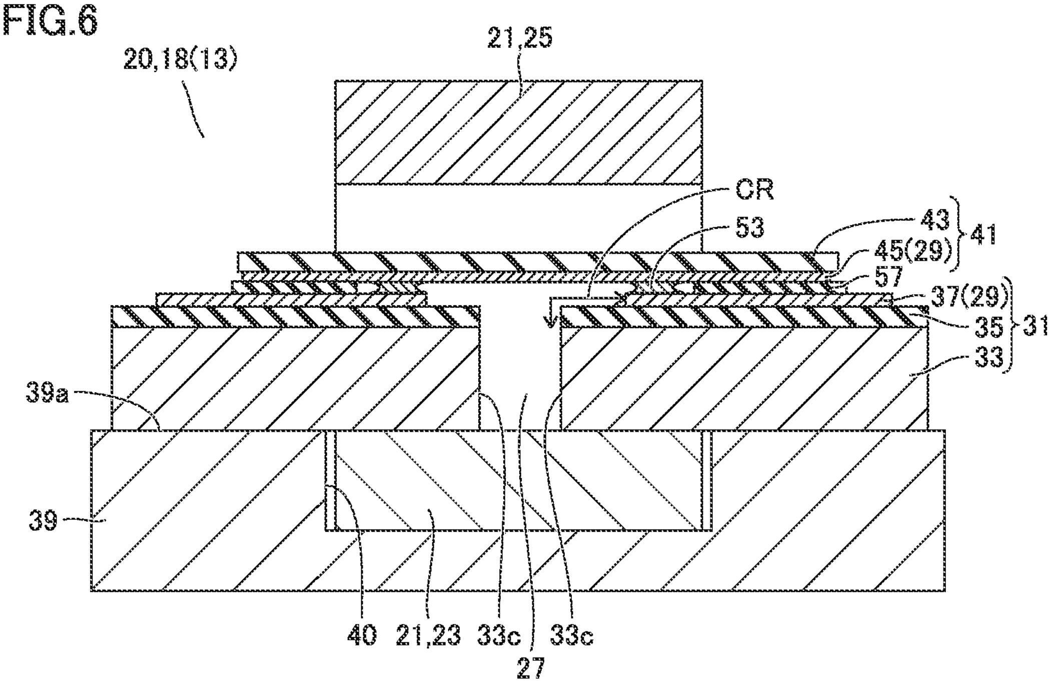
FIG. 6 is a sectional view taken along a sectional line VI-VI in FIG. 3 in the first embodiment.

Furthermore, as illustrated in FIG. 6, coil pattern 37 and end surface 33*c* of metal base body 33 are separated from each other by a creepage distance CR. By securing creepage distance CR, in a case where the potential of coil pattern 37 is different from the potential of metal base body 33, it is possible to prevent occurrence of dielectric breakdown on a creepage surface between coil pattern 37 and end surface 33*c* of metal base body 33.

Creepage distance CR is set on the basis of the potential of coil pattern 37 and the potential of metal base body 33. As the potential difference between the potential of coil pattern 37 and the potential of metal base body 33 increases, creepage distance CR needs to be set longer. In addition, from the viewpoint of preventing dielectric breakdown, coil pattern 37 is preferably, for example, a rounded pattern so as not to have a sharp portion at a corner or the like as much as possible.

As illustrated in FIGS. 2 and 6, wiring member 41 is disposed so as to electrically connect coil pattern 37 disposed in one portion of metal base body 33 divided by slit 27 and coil pattern 37 disposed in the other portion of metal base body 33. A printed circuit board is applied as wiring member 41. As wiring member 41, for example, a metal bus bar covered with an insulating film or the like may be applied in addition to the printed circuit board.

Wiring member 41 includes an insulating part 43 and wiring body 45. In this case, wiring body 45 is formed on a side of insulating part 43 facing coil pattern 37. Similarly to coil pattern 37 and the like, wiring body 45 includes, for example, copper, nickel, gold, aluminum, silver, tin, or the like.

Insulating part 43 has electrical insulation. Insulating part 43 includes, for example, glass fiber-reinforced epoxy resin, phenol resin, poly phenylene sulfide (PPS), poly ether ketone (PEEK), or the like.

As described above, the printed circuit board applied as wiring member 41 may include a material generally having a relatively low thermal conductivity. That is, the printed circuit board applied as wiring member 41 may be a general-purpose printed circuit board. In addition, a ceramic substrate such as aluminum oxide, aluminum nitride, or silicon carbide may be applied as printed circuit board applied as wiring member 41. Note that a conductive part (not illustrated) may be formed on the surface or inside wiring member 41.

As wiring member 41, for example, a laminated busbar obtained by laminating an insulating film sheet and a metal conductor and performing lamination processing may be used. As the insulating film sheet, for example, a film including polyethylene terephthalate (PET), a film including polyimide (PI), or paper including aramid (wholly aromatic polyamide) fibers is applied. The insulating film sheet may be adhered to a metal conductor serving as a wiring body by an adhesive layer or a cohesive layer.

As illustrated in FIG. 6, wiring body 45 of wiring member 41 is electrically connected to coil pattern 37 via a bonding member 53. Bonding member 53 includes a conductive material. As bonding member 53, for example, a conductive adhesive, solder, or the like can be applied. Wiring member 41 and metal base substrate 31 are thermally coupled to a bonding member 53 interposed therebetween so as to be thermally conductive.

Preferably, heat conducting member 57 as the first heat conducting member is further interposed between coil pattern 37 and wiring body 45. Wiring member 41 and metal base substrate 31 are thermally coupled to each other with heat conducting member 57 interposed therebetween in addition to bonding member 53 so as to be thermally conductive. The thermal conductivity of heat conducting member 57 is, for example, preferably 0.1 W/(m·K) or more, more preferably 1.0 W/(m·K) or more, still more preferably 10.0 W/(m·K) or more. As heat conducting member 57, for example, heat conductive grease, a heat conductive sheet, a heat conductive adhesive, or the like can be applied.

Metal base substrate 31 on which coil pattern 37 is formed is placed on cooling body 39. Metal base substrate 31 is fixed to cooling body 39 with a screw (not illustrated). In cooling body 39, a groove 40 is formed in main surface 39*a* facing metal base body 33. E-shaped core 23 is accommodated in groove 40. The thermal conductivity of cooling body 39 is, for example, preferably 1.0 W/(m· K) or more, more preferably 10.0 W/(m·K) or more, still more preferably 100.0 W/(m·K) or more.

Cooling body 39 includes, for example, a metal material such as copper, iron, aluminum, an iron alloy, or an aluminum alloy. Alternatively, cooling body 39 may include, for example, a resin having high thermal conductivity. Note that cooling body 39 may be electrically connected to other members so as to have the same potential as a ground potential.

Main surface 39*a* of cooling body 39 abuts on second main surface 33*b* (see FIG. 4) of metal base body 33, and thus, cooling body 39 and metal base body 33 (metal base substrate 31) are thermally coupled to each other so as to be thermally conductive. By interposing a heat conducting member (not illustrated) between main surface 39*a* of cooling body 39 and second main surface 33*b* of metal base body 33, heat is more easily conducted.

In addition, since cooling body 39 is in contact with E-shaped core 23 (core 21) on the bottom surface of groove 40, core 21 and cooling body 39 are thermally coupled to each other so as to be thermally conductive. By interposing a heat conducting member (not illustrated) between groove 40 and E-shaped core 23 of cooling body 39, heat is more easily conducted.

Note that E-shaped core 23 and cooling body 39 may be adhered to each other by an adhesive (not illustrated) or the like. In addition, cooling body 39 may constitute a part of a housing of coil device 20. Cooling body 39 may constitute a part of a housing of power conversion device 1 including coil device 20. Furthermore, a face of cooling body 39 different from a face on which metal base substrate 31 is disposed may be air-cooled or water-cooled.

First Modification (First Example and Second Example)

Figure 7:
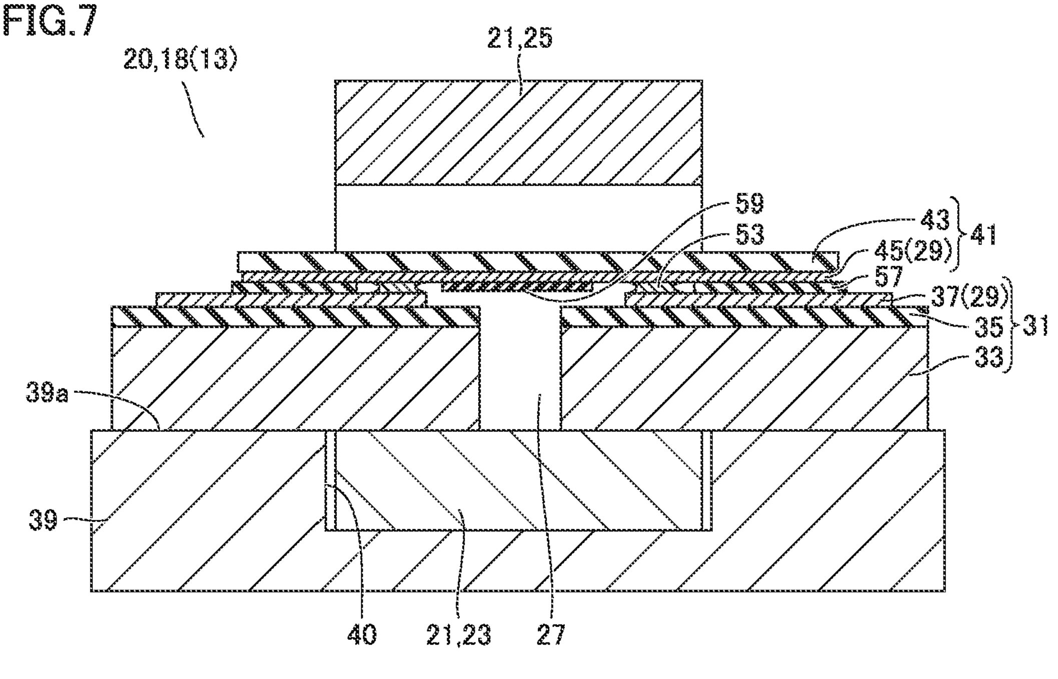
FIG. 7 is a sectional view illustrating an example of a coil device according to a first example of a first modification in the first embodiment.
Figure 8:
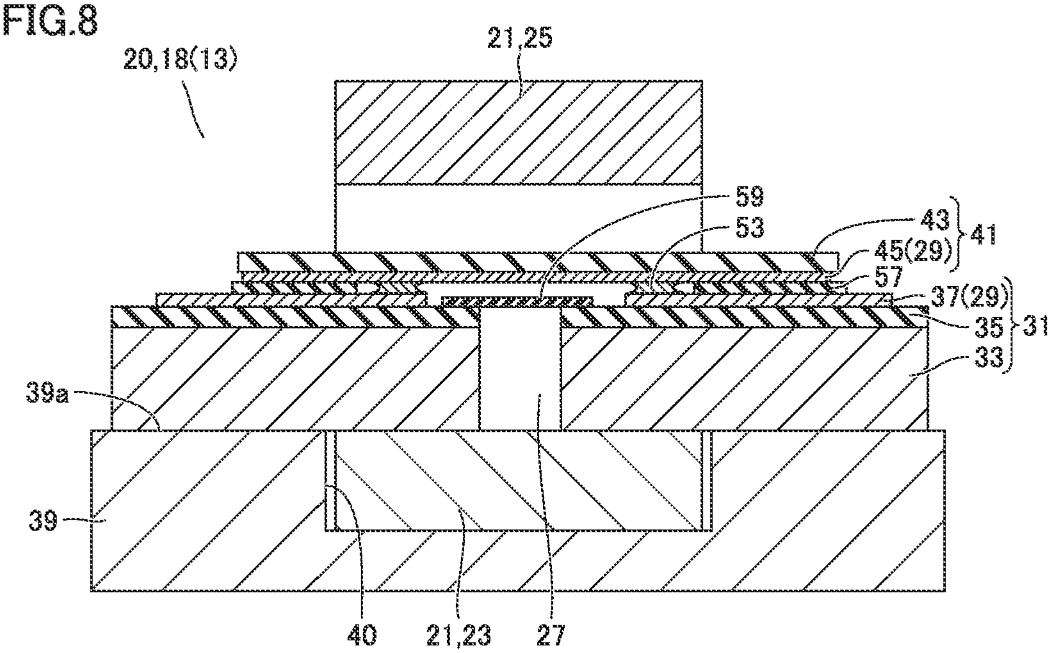
FIG. 8 is a sectional view illustrating an example of a coil device according to a second example of the first modification in the first embodiment.

As illustrated in FIG. 7, insulating member 59 may be disposed so as to cover a portion of wiring body 45 of wiring member 41 located above slit 27 (first example). As illustrated in FIG. 8, insulating member 59 may be disposed so as to cover slit 27 (second example). Insulating member 59 is only required to include a material having electrical insulation. As insulating member 59, for example, a cohesive tape obtained by applying a silicon-based glue to a polyimide tape may be applied.

In coil device 20 illustrated in FIG. 7 and coil device 20 illustrated in FIG. 8, the distance (space distance) between wiring body 45 and metal base body 33 can be increased by arranging insulating member 59. Accordingly, in a case where the potential of wiring body 45 is different from the potential of metal base body 33, it is possible to more effectively prevent occurrence of dielectric breakdown in the region (space) between wiring body 45 and metal base body 33.

Second Modification

Figure 9:
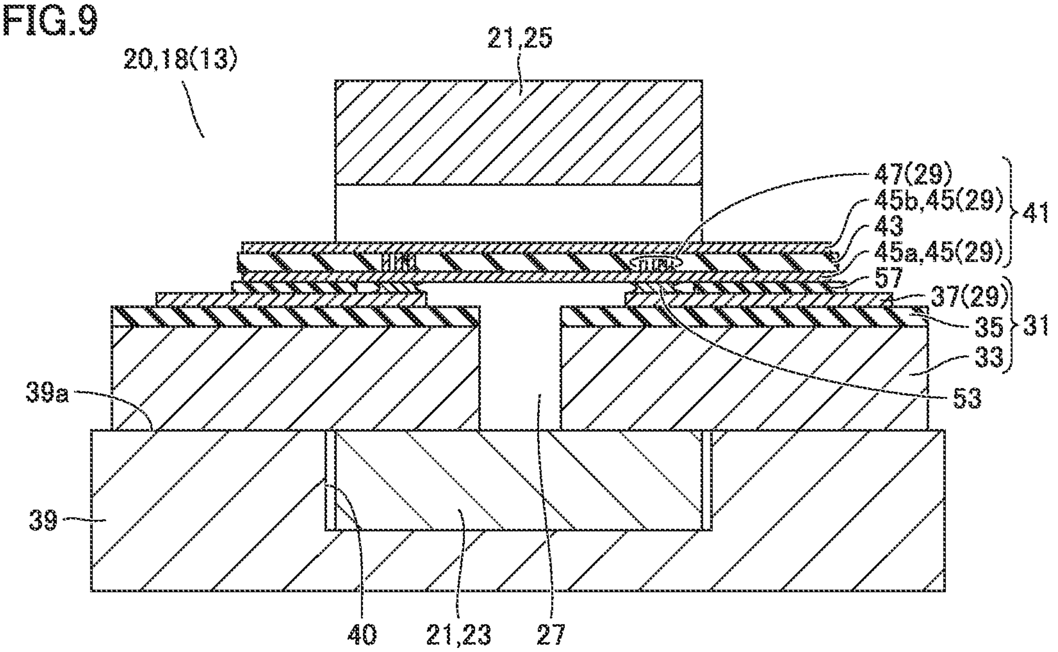
FIG. 9 is a sectional view illustrating an example of a coil device according to a second modification in the first embodiment.

As illustrated in FIG. 9, as wiring member 41, wiring member 41 may be applied in which a wiring body 45*a* is formed on a surface (lower surface) of insulating part 43 facing metal base substrate 31, and a wiring body 45*b* is formed on a surface (upper surface) opposite to the surface of insulating part 43 facing metal base substrate 31. Wiring body 45*a* and wiring body 45*b* are electrically connected by a through hole conductive part 47 formed so as to penetrate insulating part 43. Note that, in coil device 20 illustrated in FIG. 9, insulating member 59 illustrated in FIG. 7 or 8 may be disposed.

Third Modification

Figure 10:
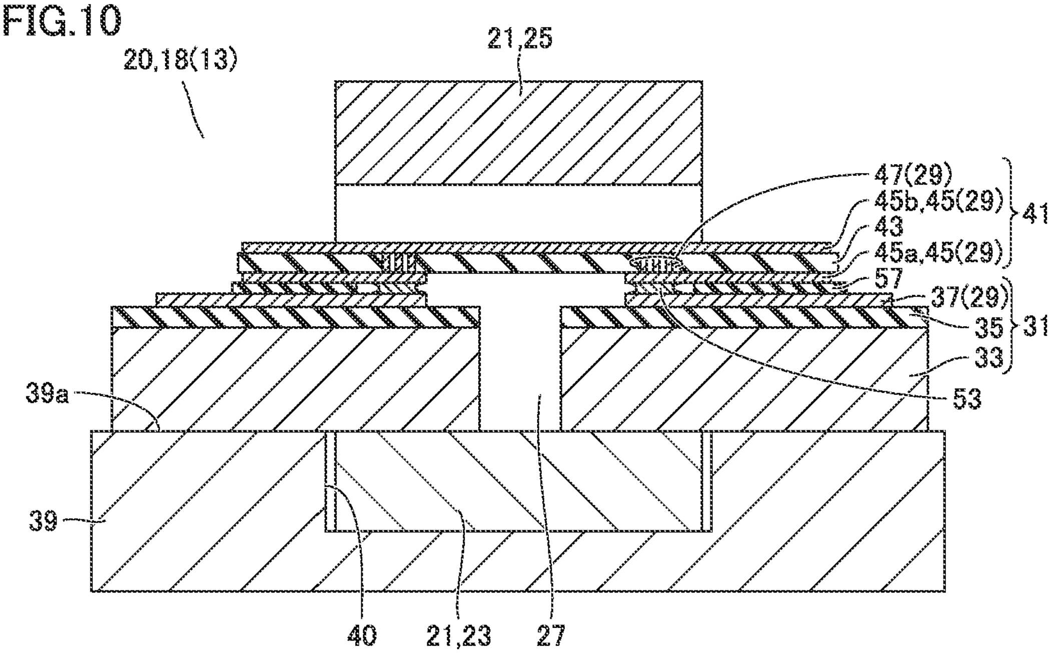
FIG. 10 is a sectional view illustrating an example of a coil device according to a third modification in the first embodiment.

As illustrated in FIG. 10, wiring body 45*a* may be formed in which a portion located immediately above slit 27 is excluded from the surface of insulating part 43 facing metal base substrate 31. By adopting a structure in which wiring body 45*a* is not disposed on the portion of the surface of insulating part 43 located immediately above slit 27, it is possible to secure the distance (space distance) between wiring body 45*a* and metal base body 33 without arranging insulating member 59 illustrated in FIG. 7 or 8.

Accordingly, in a case where the potential of wiring body 45*a* is different from the potential of metal base body 33, it is possible to more effectively prevent occurrence of dielectric breakdown in the region (space) between wiring body 45 and metal base body 33. Note that wiring member 41 having the structure illustrated in FIG. 10 may be applied as coil device 20 illustrated in FIG. 2.

Fourth Modification

Figure 11:
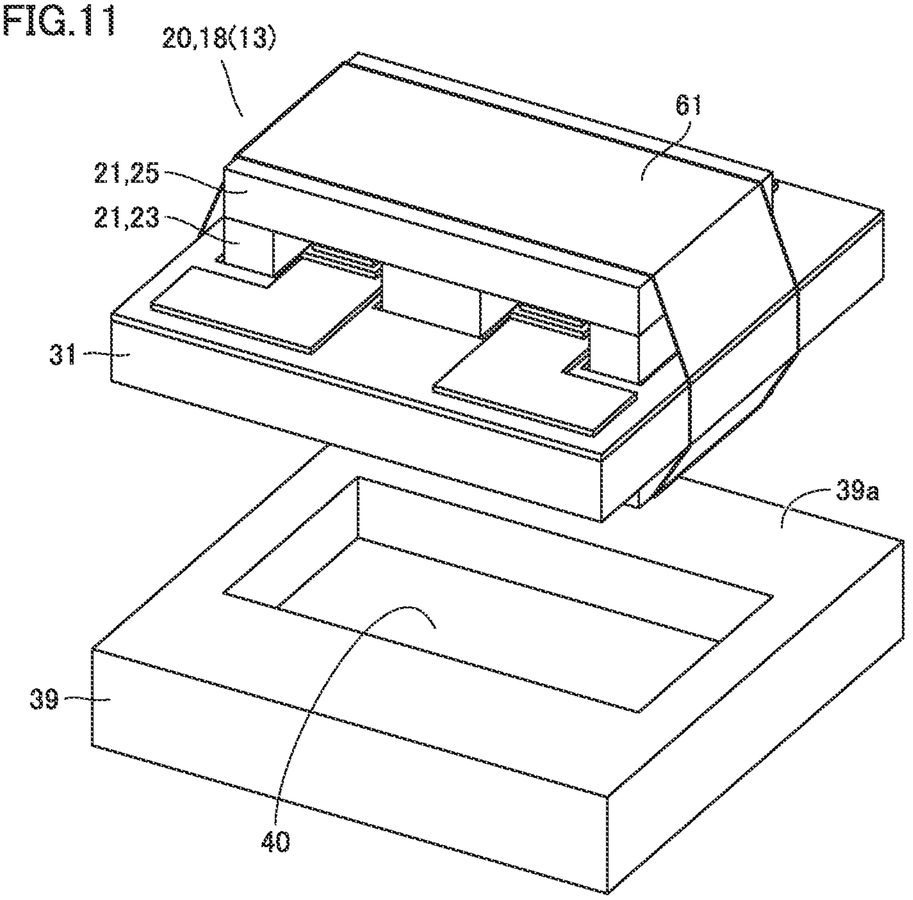
FIG. 11 is an exploded perspective view illustrating an example of a coil device according to a fourth modification in the first embodiment.

As illustrated in FIG. 11, core 21 and metal base substrate 31 may be fixed to each other by a fixing tape 61. As fixing tape 61, for example, a cohesive tape obtained by applying an acrylic glue to a polyester film can be applied. In cooling body 39, the size of each portion including groove 40 is set such that fixing tape 61 for fixing core 21 and metal base substrate 31 does not interfere with cooling body 39. Note that metal base substrate 31 is fixed to cooling body 39 with a screw (not illustrated), for example.

Fifth Modification

Figure 12:
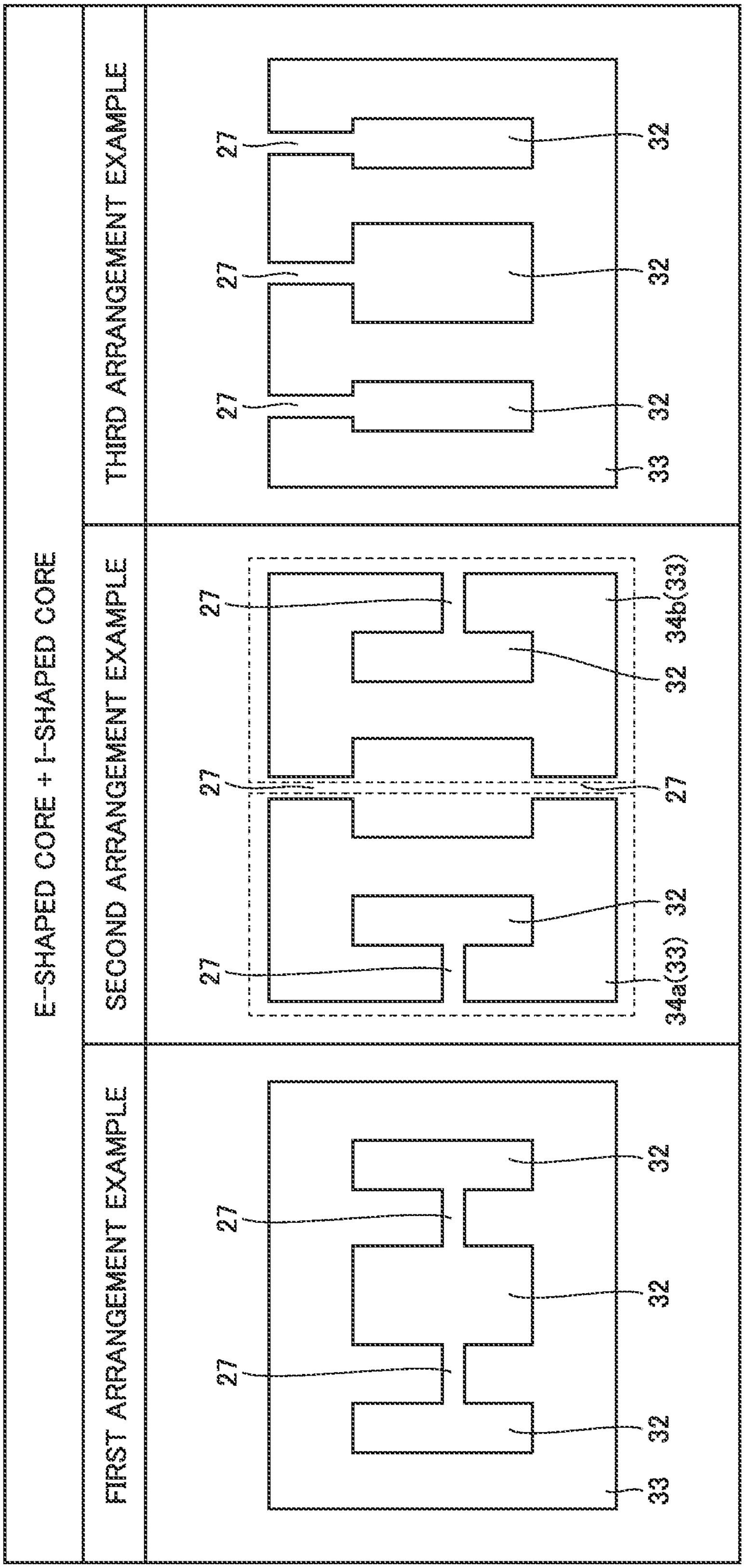
FIG. 12 is a diagram illustrating a variation of the arrangement of slits in a coil device according to a fifth modification in the first embodiment.

Here, in coil device 20 to which core 21 including E-shaped core 23 and I-shaped core 25 is applied, variations in the arrangement positions of the slits formed in the metal base body (metal base substrate) will be described. FIG. 12 illustrates a second arrangement example and a third arrangement example as arrangement positions of slits 27 formed in metal base body 33 in addition to a first arrangement example illustrated in FIG. 4.

In the second arrangement example, metal base body 33 is divided into a metal base body 34*a* and a metal base body 34*b* in plan view. Metal base body 34*a* and metal base body 34*b* are disposed with a clearance therebetween, and this clearance functions as slit 27.

Slit 27 is formed in metal base body 34*a* so as to communicate through hole 32 with an outer region of metal base body 34*a*. Slit 27 is formed in metal base body 34*b* so as to communicate through hole 32 with an outer region of metal base body 34*b*.

Metal base body 34*a* and metal base body 34*b* may be connected to each other by, for example, a connection member (not illustrated). In addition, each of metal base body 34*a* and metal base body 34*b* may be fixed to cooling body 39 (see FIG. 2) by, for example, a screw (not illustrated) or the like.

In the third arrangement example, slit 27 that communicates each of three through holes 32 with the outer region of metal base body 33 in plan view is formed.

Sixth Modification

Figure 13:
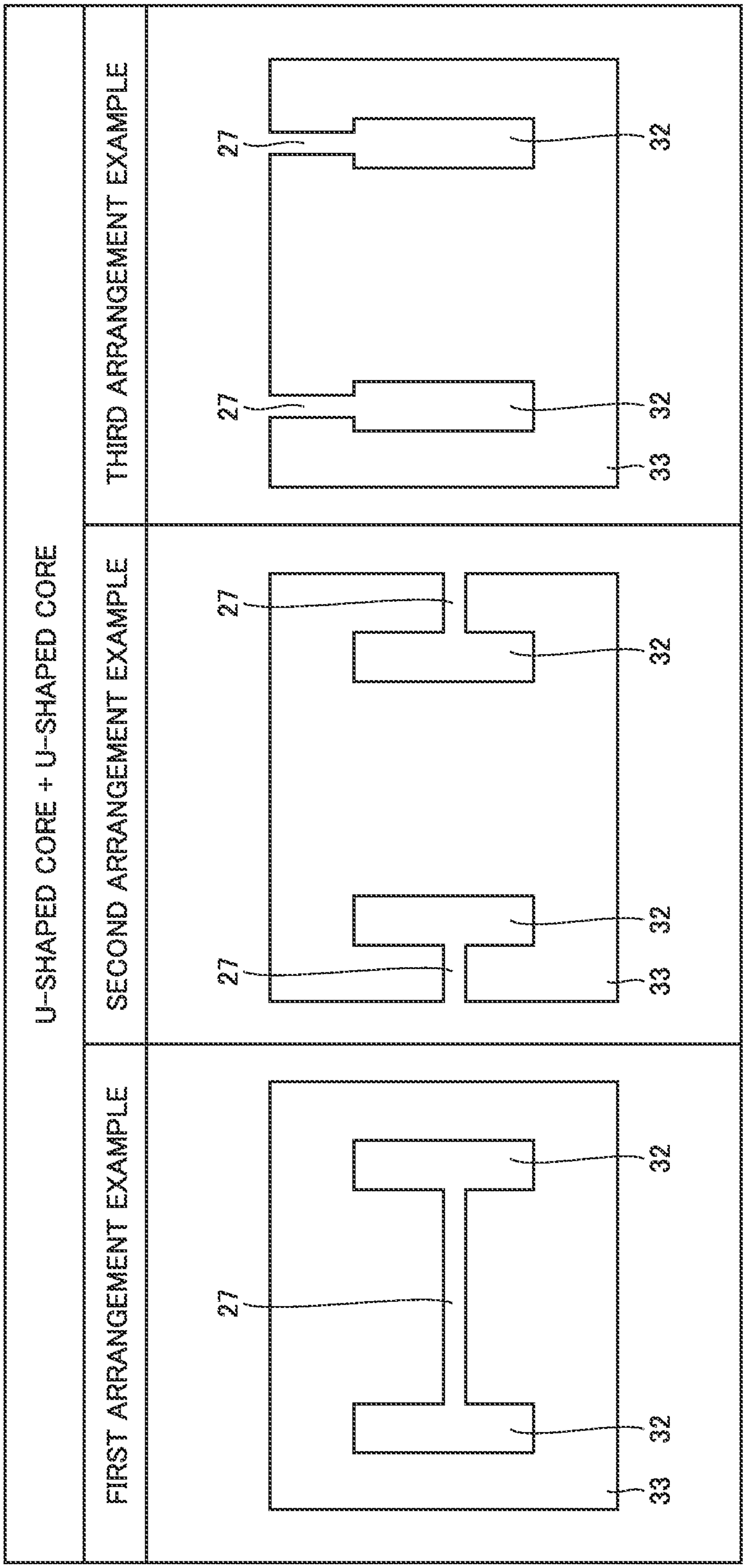
FIG. 13 is a diagram illustrating a variation of the arrangement of slits in a coil device according to a sixth modification in the first embodiment.

Here, in coil device 20 to which two U-shaped cores are applied as core 21, variations in the arrangement positions of the slits formed in the metal base body (metal base substrate) will be described. FIG. 13 illustrates a first arrangement example, a second arrangement example, and a third arrangement example as arrangement positions of slits 27 formed in metal base body 33.

In the first arrangement example, slit 27 is formed so as to communicate two through holes 32 in plan view. In each of the second arrangement example and the third arrangement example, slit 27 that communicates each of two through holes 32 with the outer region of metal base body 33 in plan view is formed. In the second arrangement example, slits 27 are formed in a direction intersecting a longitudinal direction of through hole 32. In the third arrangement example, slits 27 are formed in the longitudinal direction of through hole 32.

Metal base body 33 of metal base substrate 31 is placed on cooling body 39. At this time, when cooling body 39 includes a conductive material such as metal, metal base body 33 and cooling body 39 are electrically connected to each other. Therefore, even if slit 27 is formed in metal base body 33, induced current RP flows in a loop shape through cooling body 39, and induced current RP becomes a short coil.

Figure 14:
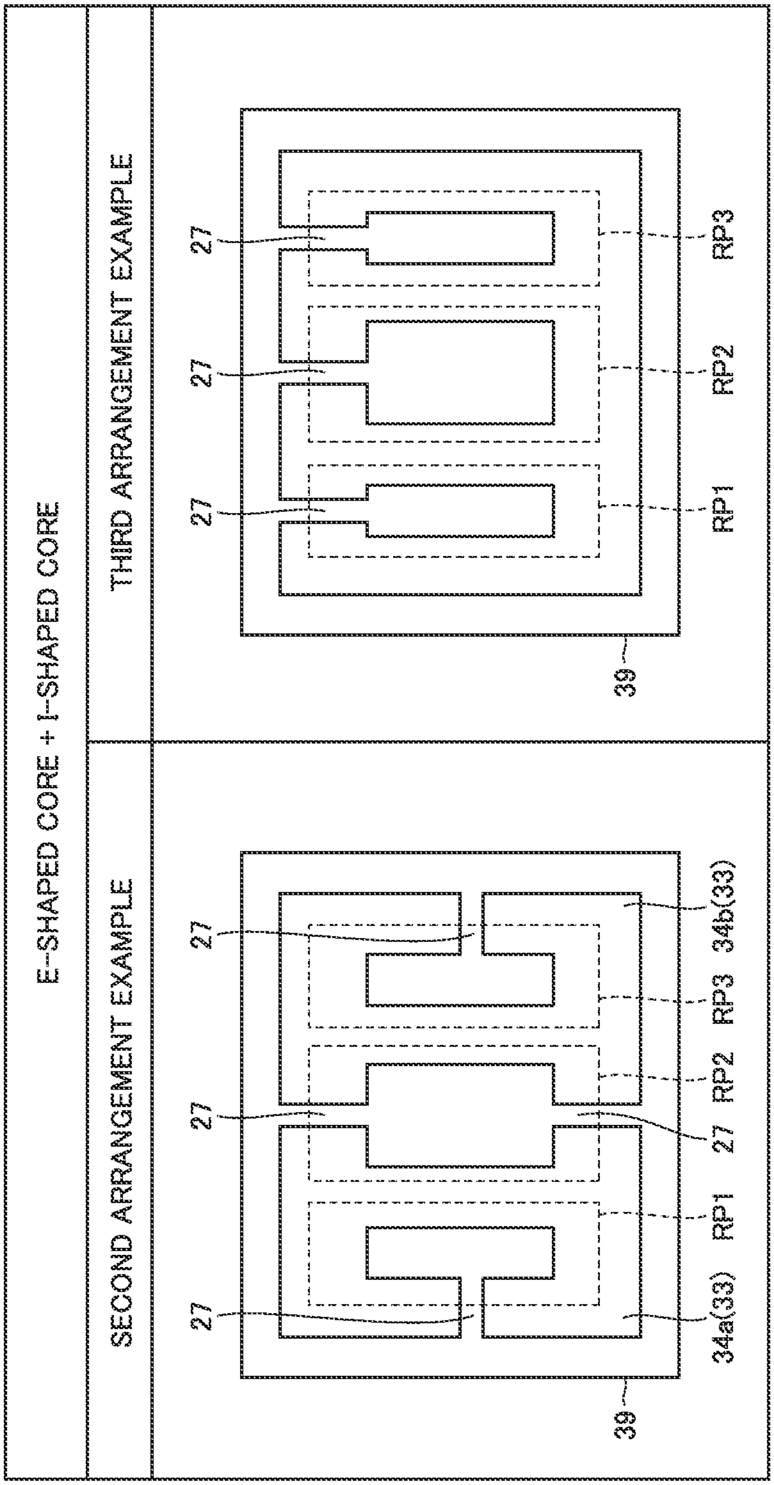
FIG. 14 is a diagram for describing an induced current formed in a cooling body assumed in the coil device according to the fifth modification in the first embodiment.

FIG. 14 illustrates induced currents assumed to be formed with cooling body 39 interposed therebetween in each of the second arrangement example and the third arrangement example illustrated in FIG. 12 among the arrangement examples of slit 27 in a case where core 21 including E-shaped core 23 and I-shaped core 25 is applied. As illustrated in FIG. 14, it is assumed that an induced current RP1, an induced current RP2, and an induced current RP3 are formed in each of the second arrangement example and the third arrangement example.

Therefore, by forming cooling body 39 from an electrically insulating material such as a resin having a relatively high thermal conductivity, it is possible to prevent such induced currents RP1, RP2, and RP3 from being formed.

Figure 15:
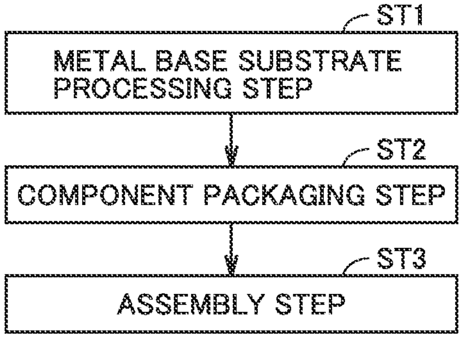
FIG. 15 is a diagram illustrating an example of steps of a method for manufacturing the coil device in the first embodiment.

Next, an example of steps of a method of manufacturing coil device 20 will be described. As illustrated in FIG. 15, coil device 20 is manufactured through a metal base substrate processing step ST1, a component packaging step ST2, and an assembly step ST3.

In metal base substrate processing step ST1, coil pattern 37 is formed on metal base body 33 with insulating layer 35 interposed therebetween. Furthermore, through hole 32 and slit 27 are formed in metal base substrate 31.

In component packaging step ST2, bonding member 53 and wiring member 41 are disposed at appropriate positions on metal base substrate 31. In a case where solder is used as bonding member 53, wiring member 41 (wiring body 45) is bonded to metal base substrate 31 (coil pattern 37) with bonding member 53 by reflow soldering or the like.

In assembly step ST3, metal base substrate 31 to which wiring member 41 is bonded, E-shaped core 23, I-shaped core 25, and cooling body 39 are combined while being fixed to each other by, for example, an adhesive or the like. At this time, metal base substrate 31, E-shaped core 23, and I-shaped core 25 may be fixed by using fixing tape 61 (see FIG. 11). In this way, coil device 20 is completed.

Next, effects of coil device 20 described above will be described. Coil device 20 includes metal base substrate 31, wiring member 41, core 21, and cooling body 39. Core 21 is formed by combining E-shaped core 23 and I-shaped core 25 in a loop shape.

In metal base substrate 31, through holes 32 through which legs 23*a*, 23*b*, and 23*c* of E-shaped core 23 are respectively inserted are formed. Metal base substrate 31 includes metal base body 33, insulating layer 35, and coil pattern 37. Metal base body 33 and coil pattern 37 are electrically insulated by insulating layer 35. Coil pattern 37 is disposed so as to pass through a space (region) surrounded by E-shaped core 23 and I-shaped core 25. That is, coil pattern 37 is disposed so as to pass through the inner region of core 21.

In metal base substrate 31 (metal base body 33), a slit 27 is formed so as not to form a short coil on core 21. Coil pattern 37 disposed on one side of metal base substrate 31 and coil pattern 37 disposed on the other side of metal base substrate 31 across slit 27 are electrically connected by wiring member 41. Wiring member 41 is electrically connected to coil pattern 37 by bonding member 53.

Groove 40 in which core 21 (E-shaped core 23) is accommodated is formed in cooling body 39. In completed coil device 20, second main surface 33*b* of metal base body 33 and main surface 39*a* of cooling body 39 are in contact with each other, and metal base body 33 and cooling body 39 are thermally coupled to each other.

In coil device 20 described above, first, the heat generated from the portion of coil pattern 37 disposed in an outer region of core 21 is dissipated to cooling body 39 via insulating layer 35 and metal base body 33. On the other hand, the heat generated from the portion of coil pattern 37 disposed in the inner region of core 21 is also dissipated to cooling body 39 via insulating layer 35 and metal base body 33. As a result, the heat dissipation of the heat generated from the portion of coil pattern 37 disposed in the inner region of core 21 is improved to the same extent as the heat dissipation of the heat generated from the portion of coil pattern 37 disposed in the outer region of core 21.

This eliminates the need for increasing the size of the pattern of the portion of coil pattern 37 located in the inner region of core 21 in order to improve the heat dissipation of the heat generated from the portion of coil pattern 37 disposed in the inner region of core 21, as in the coil device disclosed in PTL 1, for example. As a result, it is possible to contribute to miniaturization of coil device 20, and eventually, to contribute to miniaturization of power conversion device 1 including coil device 20.

In addition, wiring member 41 (wiring body 45) and metal base substrate 31 (coil pattern 37) are thermally coupled to each other with bonding member 53 interposed therebetween. Therefore, heat generated in wiring member 41 (wiring body 45) is dissipated to cooling body 39 via bonding member 53, coil pattern 37, insulating layer 35, and metal base body 33. This eliminates the need for increasing the size of the pattern of wiring member 41 in order to dissipate the heat generated in wiring member 41 (wiring body 45). As a result, it is possible to contribute to the miniaturization of coil device 20, and eventually, to the miniaturization of power conversion device 1.

Furthermore, the shorter the distance between one end surface 33*c* and other end surface 33*c* exposed to slit 27, the shorter the length of wiring body 45 (wiring member 41) electrically connecting coil pattern 37 located on the side of one end surface 33*c* and coil pattern 37 located on the side of other end surface 33*c*. As a result, a path through which heat generated near the center in an extending direction of wiring body 45 (wiring member 41) is dissipated to cooling body 39 via bonding member 53, coil pattern 37, insulating layer 35, and metal base body 33 is shortened. As a result, the temperature rise near the center in the extending direction of wiring member 41 can be suppressed.

In addition to bonding member 53, heat conducting member 57 is filled between wiring member 41 (wiring body 45) and metal base substrate 31 (coil pattern 37). Therefore, the heat generated in wiring member 41 (wiring body 45) is effectively dissipated to cooling body 39 via heat conducting member 57, coil pattern 37, insulating layer 35, and metal base body 33. This eliminates the need for increasing the size of the pattern of wiring member 41 in order to effectively dissipate the heat generated in wiring member 41 (wiring body 45), and can contribute to the miniaturization of coil device 20 and eventually, to the miniaturization of power conversion device 1.

Furthermore, a heat conducting member (not illustrated) may be interposed between metal base substrate 31 (metal base body 33) and cooling body 39, and a heat conducting member (not illustrated) may be interposed between core 21 (E-shaped core 23) and cooling body 39 (groove 40). As a result, the heat generated in wiring member 41 (wiring body 45) and dissipated to metal base body 33 is more efficiently dissipated to cooling body 39. Consequently, this further eliminates the need for increasing the size the pattern of coil pattern 37 and wiring member 41 for heat dissipation, and can contribute to the miniaturization of coil device 20 and eventually, to the miniaturization of power conversion device 1.

Seventh Modification

Figure 16:
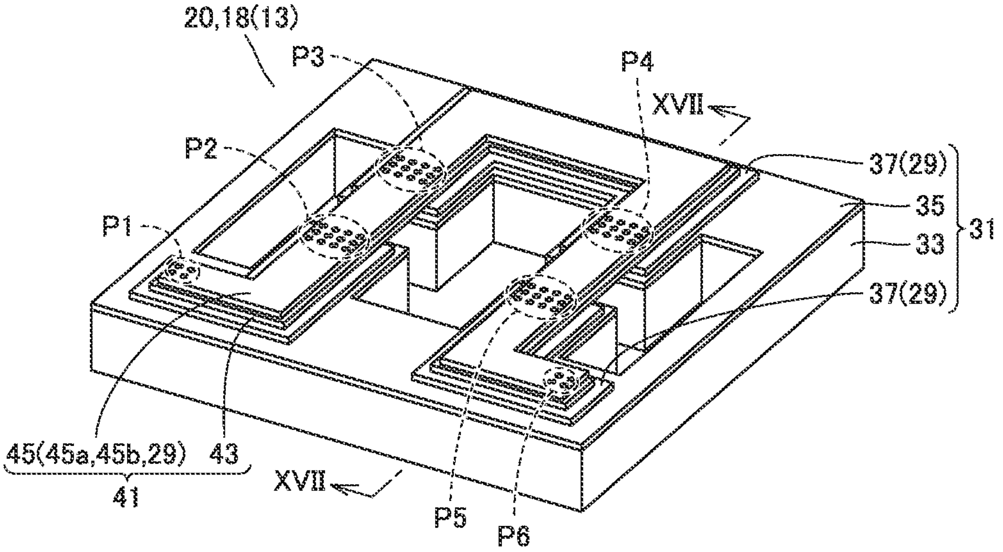
FIG. 16 is a perspective view illustrating an example of a coil device according to a seventh modification in the first embodiment.
Figure 17:
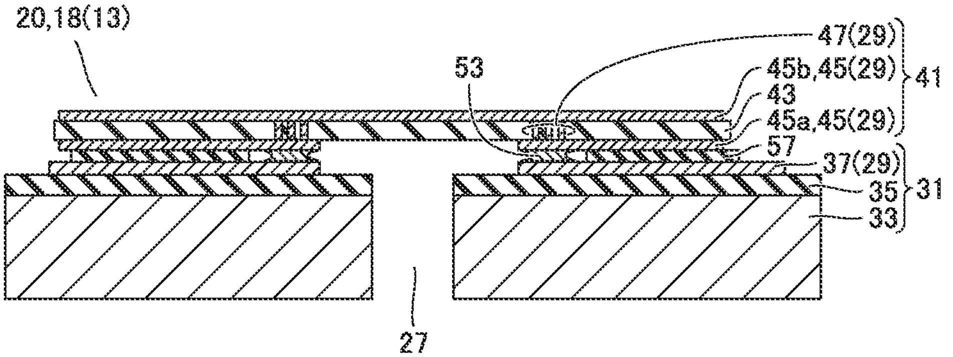
FIG. 17 is a sectional view taken along a sectional line XVII-XVII in FIG. 16 in the first embodiment.

In order to suppress the heat generated in wiring member 41 (wiring body 45), a section in which coil pattern 37 and wiring body 45 are electrically connected in parallel may be provided. As illustrated in FIGS. 16 and 17, in first winding part 29 wound around core 21 (see FIG. 2), wiring body 45 and coil pattern 37 electrically connected in parallel are disposed in each of a section between a position P1 and a position P2, a section between a position P3 and a position P4, and a section between a position P5 and a position P6.

Coil pattern 37 and wiring body 45 are electrically connected to each other by bonding member 53. Wiring body 45 includes wiring body 45*a* formed on a lower surface of insulating layer 35 and wiring body 45*b* formed on an upper surface of insulating layer 35. Wiring body 45*a* and wiring body 45*b* are electrically connected to each other via through hole conductive part 47.

As described above, by providing a section in which coil pattern 37 and wiring body 45 are electrically connected to each other in parallel, wiring body 45 also becomes a part of first winding part 29 in addition to coil pattern 37. As a result, the sectional area of a flow path of a current flowing through first winding part 29 increases, and Joule heat generated in first winding part 29 can be reduced. Consequently, this further eliminates the need for increasing the size of the pattern of coil pattern 37 for heat dissipation, and can contribute to the miniaturization of coil device 20 and eventually, to the miniaturization of power conversion device 1.

As illustrated in FIG. 17, heat conducting member 57 may be interposed between coil pattern 37 and wiring body 45. Therefore, the heat generated in wiring member 41 (wiring body 45) is effectively dissipated to cooling body 39 via heat conducting member 57, coil pattern 37, insulating layer 35, and metal base body 33. As a result, this eliminates the need for increasing the size of the pattern of wiring member 41 in order to effectively dissipate the heat generated in wiring member 41 (wiring body 45), and can contribute to the miniaturization of coil device 20 and eventually, to the miniaturization of power conversion device 1.

Furthermore, as wiring member 41, a structure has been exemplified in which one printed circuit board in which wiring body 45 is formed on both surfaces of insulating part 43 is disposed. However, wiring member 41 in which two or more printed circuit boards are laminated may be applied. In this case, for example, in the one printed circuit board and the other printed circuit board, the wiring body formed on the upper surface of the insulating part of the one printed circuit board and the wiring body formed on the lower surface of the insulating part of the other printed circuit board are electrically connected to each other by the bonding member.

As wiring member 41, for example, a multilayer printed circuit board in which an insulating part and a wiring body are alternately laminated may be applied. By applying such a multilayer printed circuit board, it is possible to increase the area of the region where the wiring body to be a part of first winding part 29 is disposed on the surface or inside the insulating part. In a case where wiring member 41 is, for example, a two-layer printed circuit board, the area of the region where the wiring body can be formed is about twice as large as that in a case where the wiring member is a single-layer printed circuit board.

As a result, the sectional area of a flow path of a current flowing through the wiring body to be a part of first winding part 29 increases, and the Joule heat generated in first winding part 29 can be further reduced. Consequently, this further eliminates the need for increasing the size of the pattern of coil pattern 37 for heat dissipation, and can contribute to the miniaturization of coil device 20 and eventually, to the miniaturization of power conversion device 1.

Eighth Modification

As wiring member 41, a wiring member in which a conductive part electrically insulated from the wiring body is formed may be applied as the insulating part, and the conductive part may be thermally bonded to cooling body 39 with metal base substrate 31 interposed therebetween.

Figure 18:
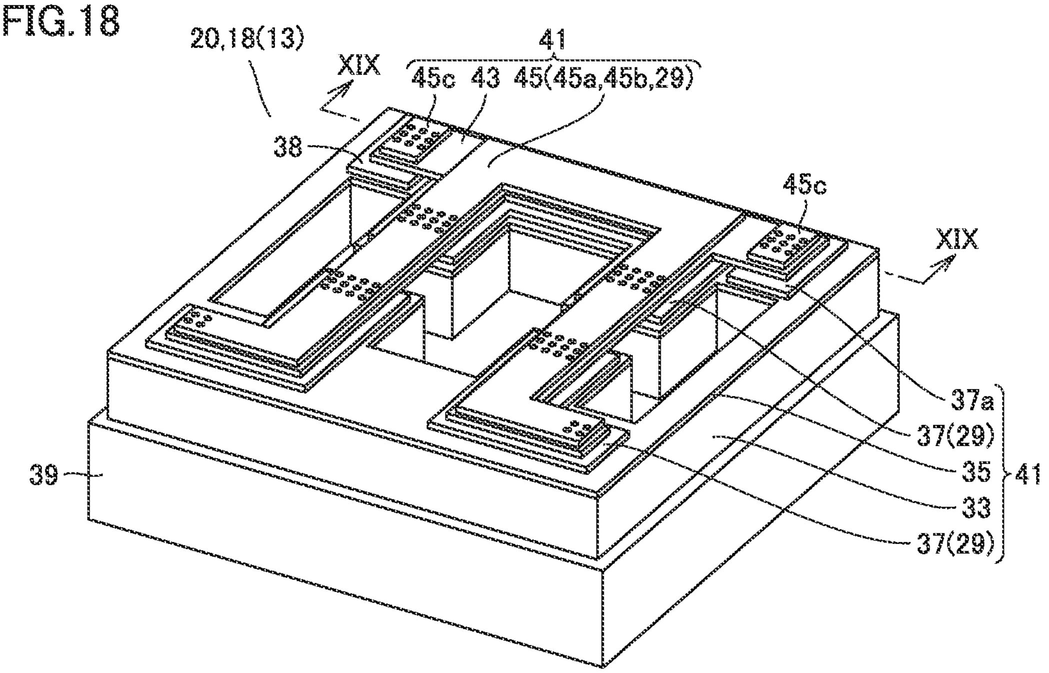
FIG. 18 is a perspective view illustrating an example of a coil device according to an eighth modification in the first embodiment.
Figure 19:
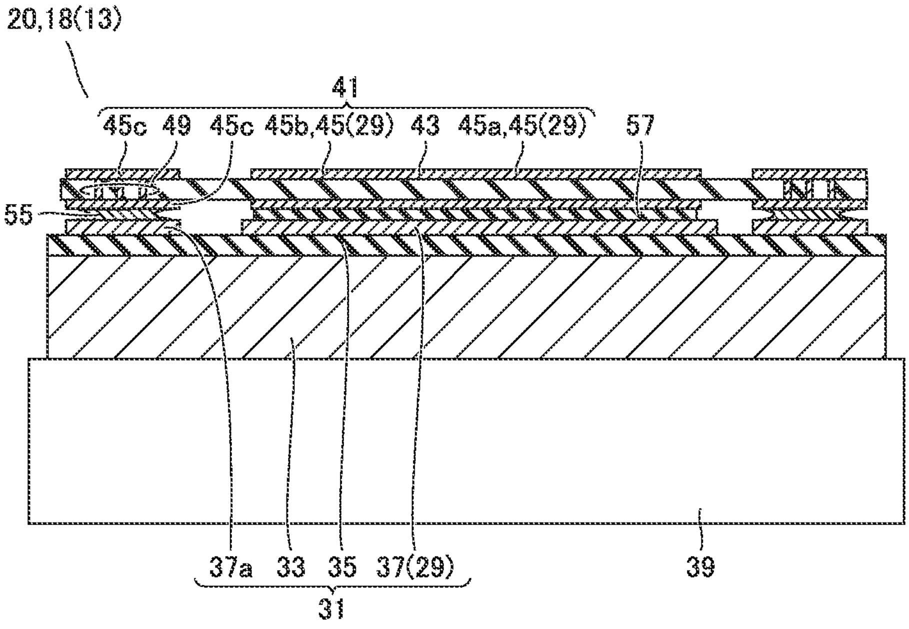
FIG. 19 is a sectional view taken along a sectional line XIX-XIX in FIG. 18 in the first embodiment.

As illustrated in FIGS. 18 and 19, in wiring member 41, a conductive part 45*c* electrically insulated from wiring body 45*a* is formed on the lower surface of insulating part 43. Conductive part 45*c* electrically insulated from wiring body 45*b* is formed on the upper surface of insulating part 43. Conductive part 45*c* formed on the upper surface of insulating part 43 and conductive part 45*c* formed on the lower surface of insulating part 43 are thermally coupled by through hole conductive part 49.

Conductive part 45*c* formed on the lower surface of insulating part 43 is bonded to a wiring pattern 37*a* formed in insulating layer 35 in metal base substrate 31 by bonding member 55. Wiring pattern 37*a* is electrically insulated from coil pattern 37.

In wiring member 41 as described above, heat generated in wiring bodies 45*a* and 45*b* is dissipated to cooling body 39 via heat conducting member 57 and metal base substrate 31, and is dissipated from wiring bodies 45*a* and 45*b* to cooling body 39 via insulating part 43, conductive part 45*c*, bonding member 55, wiring pattern 37*a*, insulating layer 35, and metal base body 33.

Accordingly, the heat generated in wiring bodies 45*a* and 45*b* can be more efficiently dissipated to cooling body 39. Consequently, this eliminates the need for increasing the size of the pattern of wiring member 41 for heat dissipation, and can contribute to the miniaturization of coil device 20 and eventually, to the miniaturization of power conversion device 1.

Ninth Modification

Figure 20:
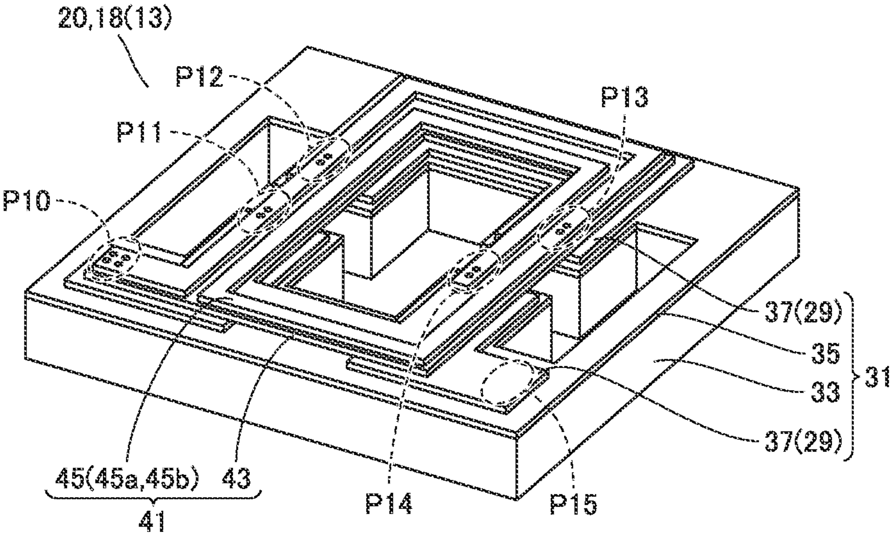
FIG. 20 is a perspective view illustrating an example of a coil device according to a ninth modification in the first embodiment.

From the viewpoint of the miniaturization of coil device 20, increasing the number of windings of first winding part 29 can contribute to miniaturization of the core. As illustrated in FIG. 20, in coil device 20, wiring body 45 (Wiring body 45*a*, wiring body 45*b*) of wiring member 41 constitutes a part of first winding part 29. Wiring body 45 is wound twice around leg 23*c* (see FIG. 2) of E-shaped core 23 (the number of windings: two (two turns)).

When a current flowing through first winding part 29 flows from a position P10 toward a position P15, the current sequentially flows through a section between position P10 and a position P11, a section between position P11 and a position P12, a section between position P12 and a position P13, a section between position P13 and a position P14, and a section between position P14 and position P15.

Here, in the section between position P10 and position P11 and the section between position P12 and position P13, wiring body 45 and coil pattern 37 are electrically connected to each other in parallel by bonding member 53 (see FIG. 17). As a result, the current flows through wiring body 45 and coil pattern 37 in parallel. In this manner, the number of windings of first winding part 29 can be increased, which contributes to the miniaturization of core 21 (E-shaped core 23 and I-shaped core 25). As a result, it is possible to contribute to the miniaturization of coil device 20, and eventually, to the miniaturization of power conversion device 1.

Furthermore, as wiring member 41, the structure has been exemplified in which one printed circuit board in which wiring body 45 is formed on both surfaces of insulating part 43 is disposed. However, wiring member 41 in which two or more printed circuit boards are laminated may be applied. In this case, for example, in the one printed circuit board and the other printed circuit board, the wiring body formed on the upper surface of the insulating part of the one printed circuit board and the wiring body formed on the lower surface of the insulating part of the other printed circuit board are electrically connected to each other by the bonding member.

Furthermore, as wiring member 41, for example, a multilayer printed circuit board in which an insulating part and a wiring body are alternately laminated may be applied. By applying wiring member 41 as described above, the number of windings of first winding part 29 (wiring body 45) can be increased, which contributes to the miniaturization of core 21. As a result, it is possible to contribute to the miniaturization of coil device 20, and eventually, to the miniaturization of power conversion device 1.

Tenth Modification

Figure 21:
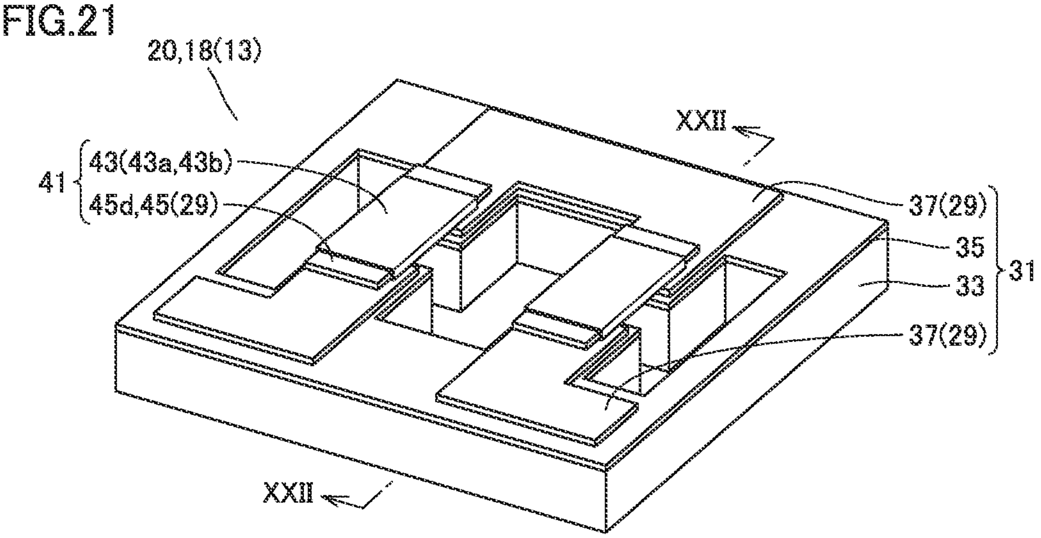
FIG. 21 is a perspective view illustrating an example of a coil device according to a tenth modification in the first embodiment.
Figure 22:
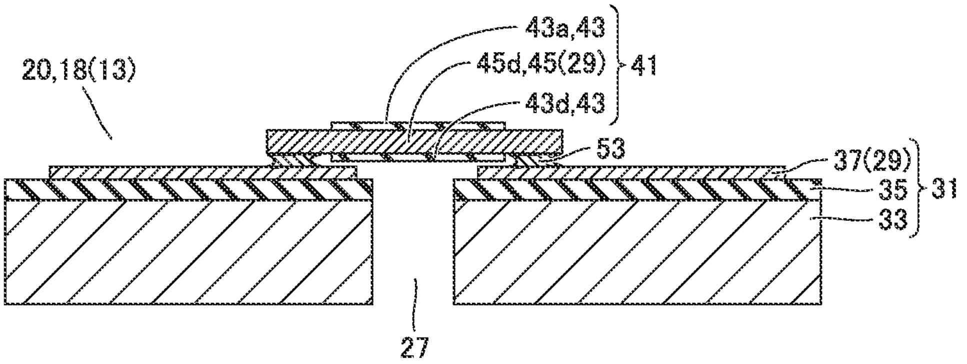
FIG. 22 is a sectional view taken along a sectional line XXII-XXII in FIG. 21 in the first embodiment.

A metal bus bar may be applied as the wiring member. As illustrated in FIGS. 21 and 22, wiring member 41 includes a metal bus bar 45*d* to be wiring body 45, and insulating parts 43*a* and 43*b* that cover metal bus bar 45*d*. Insulating part 43*a* is formed so as to expose a part of an upper surface of metal bus bar 45*d*. Insulating part 43*b* is formed so as to expose a part of a lower surface of metal bus bar 45*d*.

Metal bus bar 45*d* and coil pattern 37 are electrically connected to each other. A part of the exposed lower surface of metal bus bar 45*d* and coil pattern 37 are bonded to each other by bonding member 53. Metal bus bar 45*d* includes metal such as copper, for example, similarly to other wiring body 45. The thickness of metal bus bar 45*d* is preferably, for example, about 0.1 mm or more and 5.0 mm or less. Insulating parts 43*a* and 43*b* may include a material having electrical insulation, and includes, for example, an epoxy resin, a polyimide resin, or the like.

In particular, insulating part 43*b* is formed between one bonding member 53 and other bonding member 53 so as to cover a portion of the lower surface of the metal bus bar 45*d* located immediately above slit 27. Insulating part 43*b* has a function of preventing occurrence of dielectric breakdown in a region (space) between metal bus bar 45*d* and metal base body 33.

In general, the thickness of metal bus bar 45*d* can be easily increased as compared with wiring body 45 formed on the surface of insulating part 43 in the printed circuit board. Therefore, since the thickness metal bus bar 45*d* as wiring body 45 can be set to be larger than the thickness of wiring body 45 in the printed circuit board, the sectional area of a flow path through which a current flows can be increased. As a result, Joule heat generated in metal bus bar 45*d* (wiring body 45) can be reduced. Consequently, this eliminates the need for increasing the size of the pattern of wiring member 41 for heat dissipation, and can contribute to the miniaturization of coil device 20 and eventually, to the miniaturization of power conversion device 1.

Eleventh Modification

Figure 23:
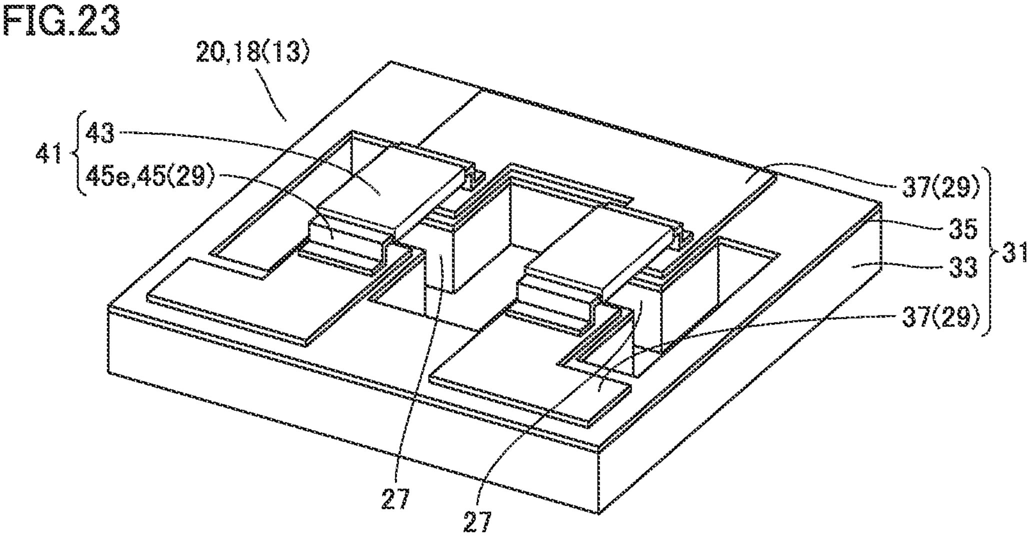
FIG. 23 is a perspective view illustrating an example of a coil device according to an eleventh modification in the first embodiment.

In a case where metal bus bar 45*d* is applied as wiring body 45, a bent metal bus bar 45*e* may be applied as illustrated in FIG. 23. Metal bus bar 45*e* is bent (or curved) in a direction away from slit 27. Accordingly, the distance between metal bus bar 45*e* and metal base body 33 increases, and occurrence of dielectric breakdown in a region (space) between metal bus bar 45*e* and metal base body 33 can be effectively prevented. As a result, the electrical insulation of coil device 20 can be improved, and eventually, the electrical insulation of power conversion device 1 can be improved.

If the distance between metal bus bar 45*e* and metal base body 33 can be increased to such an extent that there is no possibility that dielectric breakdown occurs between metal bus bar 45*e* and metal base body 33, insulating parts 43*a* and 43*b* are not required to be formed on the surface of metal bus bar 45*e*.

In order to perform efficient heat conduction, a heat conducting member may be interposed between core 21 and cooling body 39. The heat generated in core 21 can be efficiently dissipated to cooling body 39. Consequently, this eliminates the need for increasing the size of core 21 to facilitate the heat dissipation, and can contribute to the miniaturization of coil device 20 and eventually, to the miniaturization of power conversion device 1.

Twelfth Modification

Figure 24:
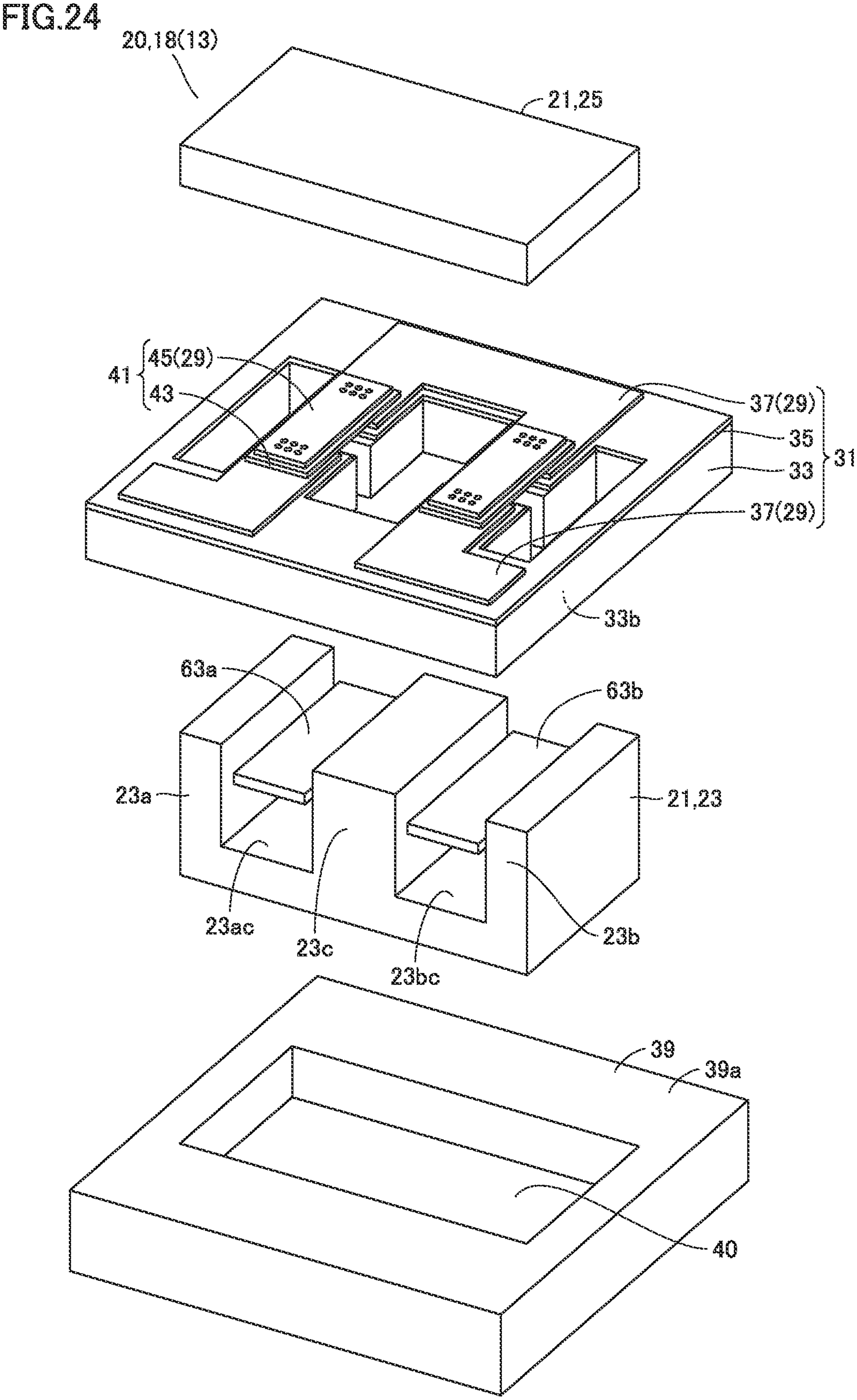
FIG. 24 is an exploded perspective view illustrating an example of a coil device according to a twelfth modification in the first embodiment.

As illustrated in FIG. 24, a heat conducting member 63*a* and a heat conducting member 63*b* as second heat conducting members may be interposed between core 21 and metal base body 33. Heat conducting member 63*a* is disposed so as to be sandwiched between a face 23*ac* of E-shaped core 23 located between leg 23*a* and leg 23*c* of E-shaped core 23 and second main surface 33*b* of metal base body 33. Heat conducting member 63*b* is disposed so as to be sandwiched between a face 23*bc* of E-shaped core 23 located between leg 23*c* and leg 23*b* of E-shaped core 23 and second main surface 33*b* of metal base body 33.

Face 23*ac* of E-shaped core 23 is in contact with heat conducting member 63*a*. Face 23*bc* of E-shaped core 23 is in contact with heat conducting member 63*b*. Second main surface 33*b* of metal base body 33 is in contact with heat conducting member 63*a* and heat conducting member 63*b*. As a result, E-shaped core 23 and metal base body 33 are thermally coupled with heat conducting members 63*a* and 63*b* interposed therebetween.

First, when the temperature of face 23*ac* (face 23*bc*) of E-shaped core 23 in contact with heat conducting member 63*a* (63*b*) is lower than the temperature of second main surface 33*b* of metal base body 33 in contact with heat conducting member 63*a* (63*b*), the heat generated in wiring member 41 (wiring body 45) and coil pattern 37 can be efficiently dissipated to cooling body 39.

The heat generated in wiring member 41 (wiring body 45) and coil pattern 37 is dissipated to cooling body 39 via insulating layer 35, metal base body 33, heat conducting members 63*a* and 63*b*, and E-shaped core 23 (core 21). Consequently, this eliminates the need for increasing the size the pattern of wiring member 41 and coil pattern 37 for heat dissipation, and can contribute to the miniaturization of coil device 20 and eventually, to the miniaturization of power conversion device 1.

On the other hand, when the temperature of face 23*ac* (face 23*bc*) of E-shaped core 23 in contact with heat conducting member 63*a* (63*b*) is higher than the temperature of second main surface 33*b* of metal base body 33 in contact with heat conducting member 63*a* (63*b*), the heat generated in core 21 (E-shaped core 23) can be efficiently dissipated to cooling body 39.

The heat generated in core 21 (E-shaped core 23) is dissipated to cooling body 39 via heat conducting members 63*a* and 63*b* and metal base body 33. Consequently, this eliminates the need for increasing the size of core 21 for heat dissipation, and can contribute to the miniaturization of coil device 20 and eventually, to the miniaturization of power conversion device 1.

Thirteenth Modification

Figure 25:
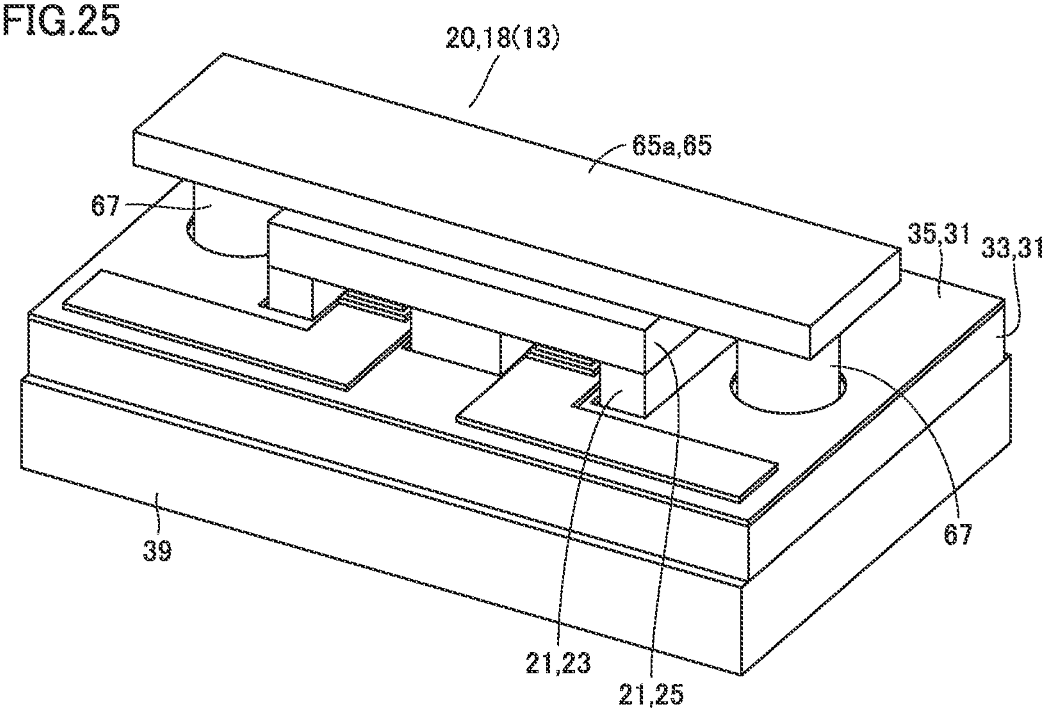
FIG. 25 is a perspective view illustrating an example of a coil device according to a thirteenth modification in the first embodiment.

A heat dissipation path for dissipating the heat generated in core 21 to the cooling body may be increased. As illustrated in FIG. 25, in coil device 20, core 21 is pressed against cooling body 39 by a strut 67 and a pressing member 65. Here, a flat member 65*a* is applied as pressing member 65. Strut 67 is formed so as to protrude from cooling body 39.

Strut 67 and pressing member 65 (flat member 65*a*) preferably include a material having good thermal conductivity, for example, metal. Flat member 65*a* is fixed to strut 67 so as to press core 21 from above. Flat member 65*a* and strut 67 are thermally coupled to each other.

As a result, the heat generated in core 21 can be directly dissipated to cooling body 39, and can be dissipated to cooling body 39 via flat member 65*a* and strut 67. Consequently, this eliminates the need for increasing the size of core 21 for heat dissipation, and can contribute to the miniaturization of coil device 20 and eventually, to the miniaturization of power conversion device 1.

Fourteenth Modification

Figure 26:
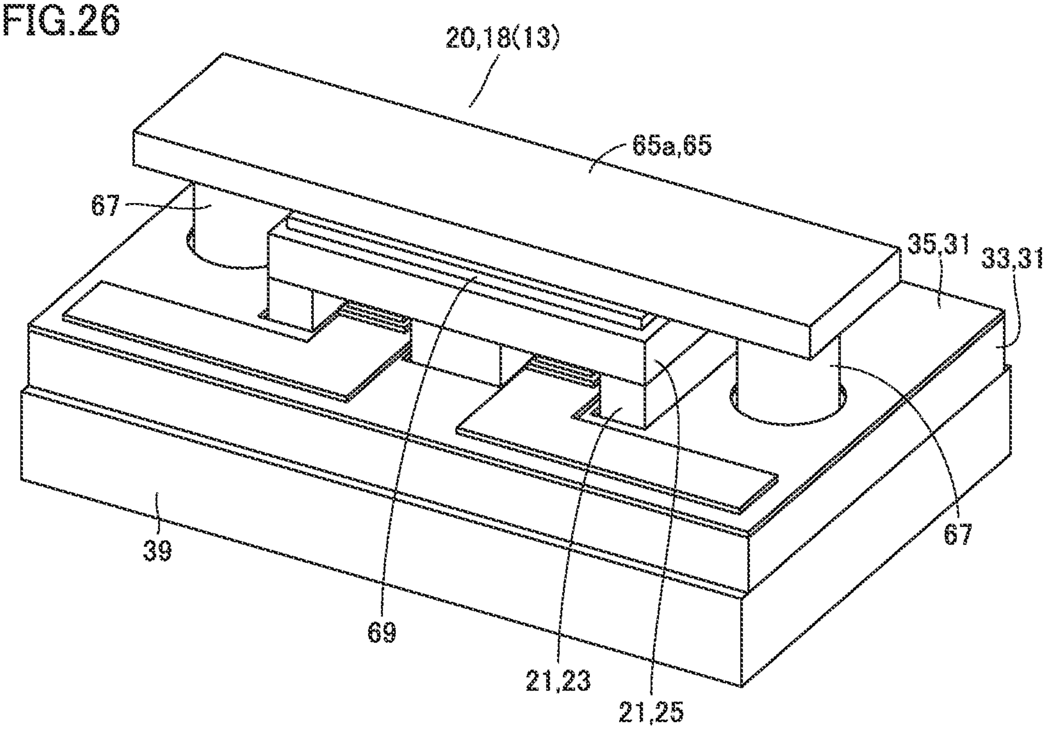
FIG. 26 is a perspective view illustrating an example of a coil device according to a fourteenth modification in the first embodiment.

As illustrated in FIG. 26, a heat conducting member 69 as a third heat conducting member may be interposed between flat member 65*a* and I-shaped core 25 (core 21). As a result, the heat generated in core 21 can be efficiently conducted to flat member 65*a* and strut 67 via heat conducting member 69, and the heat conducted to strut 67 can be dissipated to cooling body 39. Consequently, this eliminates the need for increasing the size of core 21 for heat dissipation, and can further contribute to the miniaturization of coil device 20 and eventually, to the miniaturization of power conversion device 1.

As heat conducting member 69, heat conducting member 69 including a material that is more easily deformed than core 21 may be applied. In this case, when core 21 is pressed from above by flat member 65*a*, the stress acting on core 21 is alleviated by the deformation of heat conducting member 69. Consequently, this eliminates the need for increasing the size of core 21 in order to improve toughness of core 21, and can contribute to the miniaturization of coil device 20 and eventually, to the miniaturization of power conversion device 1.

Fifteenth Modification

Figure 27:
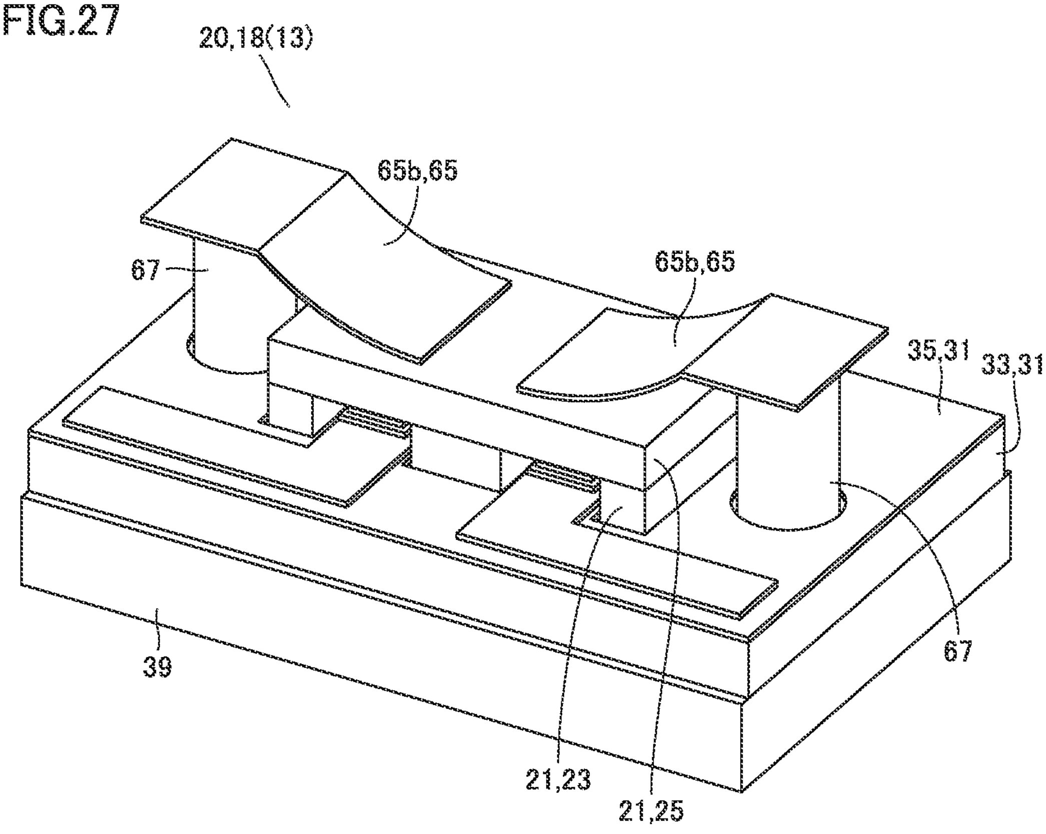
FIG. 27 is a perspective view illustrating an example of a coil device according to a fifteenth modification in the first embodiment.

Furthermore, as illustrated in FIG. 27, from the viewpoint of alleviating the stress acting on core 21, a leaf spring-like member 65*b* may be applied as pressing member 65. In this case, when core 21 is pressed by leaf spring-like member 65*b*, the stress acting on core 21 is alleviated by the deformation of leaf spring-like member 65*b*. Consequently, this eliminates the need for increasing the size of core 21 in order to improve toughness of core 21, and can contribute to the miniaturization of coil device 20 and eventually, to the miniaturization of power conversion device 1.

Sixteenth Modification

Figure 28:
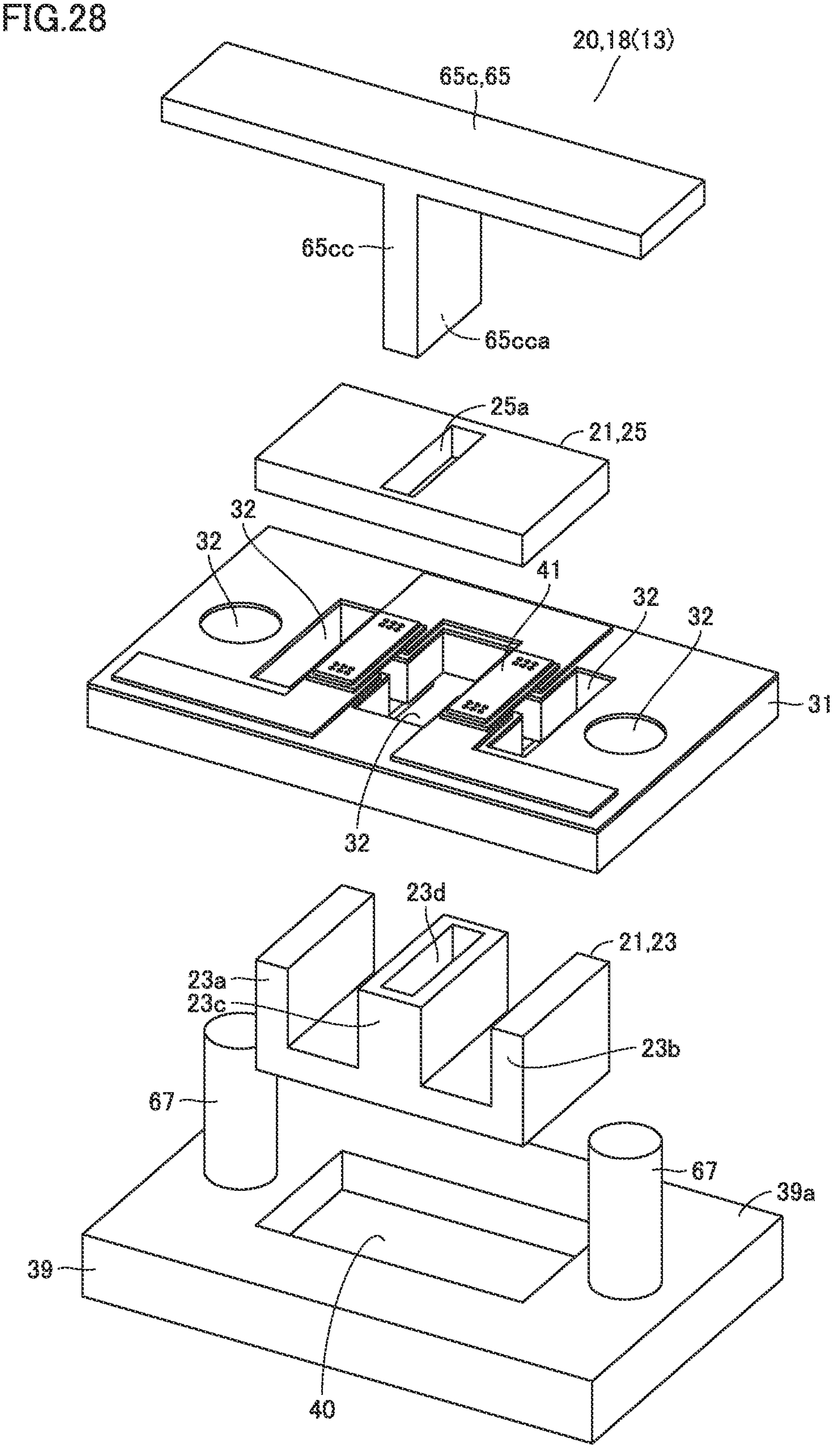
FIG. 28 is an exploded perspective view illustrating an example of a coil device according to a sixteenth modification in the first embodiment.

In addition, as illustrated in FIG. 28, in order to further increase the heat radiation path for dissipating heat generated in core 21 to the cooling body, a T-shaped member 65*c* may be applied as pressing member 65. T-shaped member 65*c* has a structure in which a protrusion 65*cc* protruding toward cooling body 39 is formed on flat member 65*a* (see FIG. 25).

A through hole 25*a* as a second through hole through which protrusion 65*cc* is inserted is formed in I-shaped core 25. A heat conducting member (not illustrated) is filled between through hole 25*a* and protrusion 65*cc*. An inner wall surface of through hole 25*a* and protrusion 65*cc* are thermally coupled to each other. A through hole 23*d* as a second through hole through which protrusion 65*cc* is inserted is formed in leg 23*c* of E-shaped core 23. A heat conducting member (not illustrated) is filled between through hole 23*d* and protrusion 65*cc*. An inner wall surface of through hole 23*d* and protrusion 65*cc* are thermally coupled to each other.

In this case, the heat generated in core 21 (E-shaped core 23 and I-shaped core 25) can be further dissipated from the inner wall surfaces of through hole 25*a* and through hole 23*d* to cooling body 39 via the heat conducting member (not illustrated) and protrusion 65*cc* of T-shaped member 65*c*. Consequently, this eliminates the need for increasing the size of core 21 for heat dissipation, and can contribute to the miniaturization of coil device 20 and eventually, to the miniaturization of power conversion device 1.

A heat conducting member (not illustrated) may be interposed between an end surface 65*cca* (bottom surface) of protrusion 65*cc* of T-shaped member 65*c* and the bottom surface of groove 40 of cooling body 39. Consequently, heat can be effectively dissipated from protrusion 65*cc* to cooling body 39, and it is possible to contribute to the miniaturization of coil device 20 and eventually, to the miniaturization of power conversion device 1.

Seventeenth Modification

Figure 29:
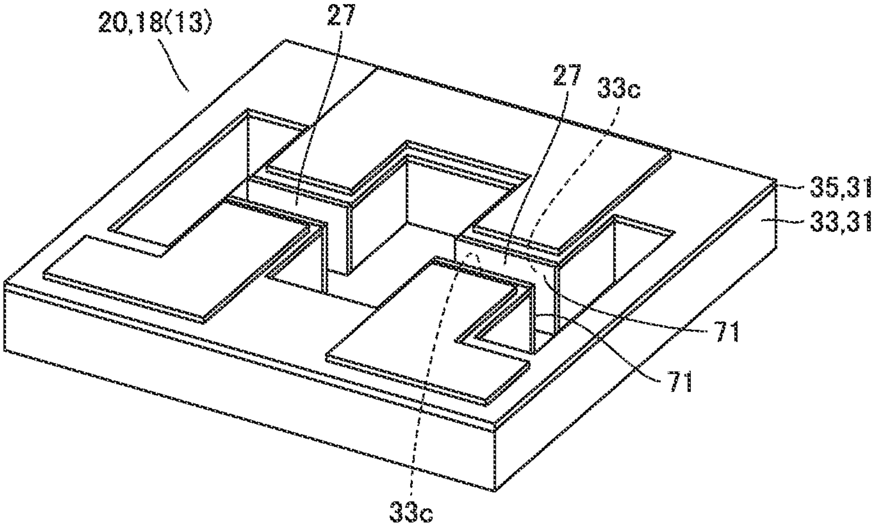
FIG. 29 is a perspective view illustrating an example of a coil device according to a seventeenth modification in the first embodiment.

As illustrated in FIG. 29, in order to prevent an electrical short circuit between end surfaces 33*c* of metal base body 33 facing each other across slit 27, a short circuit preventing member 71 may be formed on each of one end surface 33*c* and other end surface 33*c*. Short circuit preventing member 71 may be any member having electrical insulation, and for example, a cohesive tape obtained by applying a silicon-based glue to a polyimide film can be applied.

In a case where such a cohesive tape is used as short circuit preventing member 71, the cohesive tape as short circuit preventing member 71 is preferably attached so as to cover end surface 33*c*. Accordingly, even when a conductive foreign matter enters between one end surface 33*c* and other end surface 33*c* of metal base body 33, it is possible to prevent an electrical short circuit between one end surface 33*c* and other end surface 33*c*.

In addition, it is not necessary to increase the width of slit 27 in order to prevent an electrical short circuit assuming a conductive foreign matter that can enter between one end surface 33*c* and other end surface 33*c*. Thus, when metal base substrate 31 is designed, the setting (design) of the width of slit 27 in metal base body 33 can be simplified.

Eighteenth Modification

Figure 30:
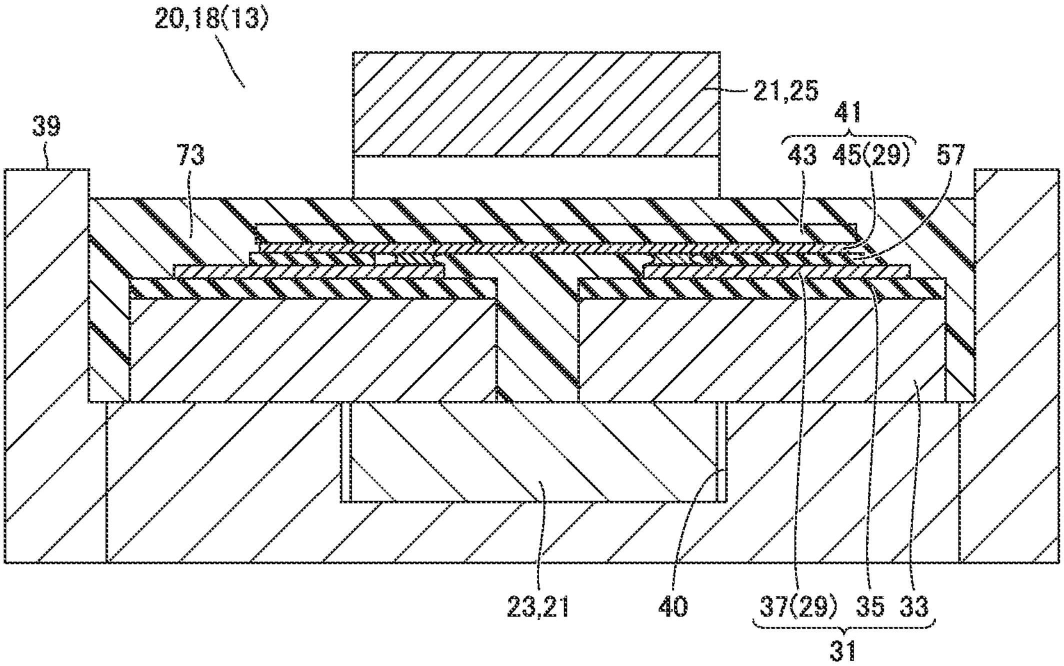
FIG. 30 is a sectional view illustrating an example of a coil device according to an eighteenth modification in the first embodiment.

As illustrated in FIG. 30, metal base substrate 31 and wiring member 41 may be sealed by a sealing member 73. In this case, cooling body 39 which is box-shaped (box-like) and opened upward is applied as cooling body 39. Cooling body 39 which is box-shaped is filled with sealing member 73 so as to seal metal base substrate 31 and wiring member 41 accommodated in cooling body 39 which is box-shaped.

Sealing member 73 may include a material having a thermal conductivity of about 0.1 W/(m·K) or more, preferably about 1.0 W/(m·K). Sealing member 73 has electrical insulation. Sealing member 73 may have a Young's modulus of 1 MPa or more. Sealing member 73 may include a resin material having elasticity. Sealing member 73 may include an epoxy resin containing a thermally conductive filler. Sealing member 73 may include a rubber material such as silicon or urethane.

By filling sealing member 73 as described above, heat generated in metal base substrate 31 (coil pattern 37) and heat generated in wiring member 41 (wiring body 45) can be dissipated to cooling body 39 via sealing member 73. Consequently, this eliminates the need for increasing the size of coil pattern 37 and wiring member 41 for heat dissipation, and can further contribute to the miniaturization of coil device 20 and eventually, to the miniaturization of power conversion device 1.

In general, between conductive materials having different potentials, a creepage distance greater than or equal to a certain distance is secured in order to prevent dielectric breakdown between one conductive material and the other conductive material. When it is assumed that the creepage between the one conductive material and the other conductive material may be contaminated by a material having electrical conductivity, it is necessary to set the creepage distance to be long.

In coil device 20 illustrated in FIG. 30, substantially the entire surface of metal base substrate 31 and substantially the entire surface of wiring member 41 are covered with sealing member 73. Therefore, it is possible to prevent the surface of metal base substrate 31 or the surface of wiring member 41 from being contaminated by a material having electrical conductivity. Consequently, it is possible to reduce the creepage distance between metal base substrate 31 and wiring member 41, and contribute to the miniaturization of coil device 20 and eventually, to the miniaturization of power conversion device 1.

Furthermore, in coil device 20 illustrated in FIG. 30, cooling body 39 is filled with sealing member 73 so as to seal metal base substrate 31 and wiring member 41 accommodated in cooling body 39, and thus, the space between metal base body 33 and wiring body 45 is also filled with sealing member 73. This can prevent occurrence of dielectric breakdown between metal base body 33 and wiring body 45.

Furthermore, sealing member 73 is also filled in slit 27. This prevents entry of conductive foreign matter between one end surface 33*c* and other end surface 33*c* of metal base body 33 facing each other across slit 27. This eliminates the need for providing short circuit preventing member 71 (see FIG. 29) on end surfaces 33*c* of metal base body 33 facing each other across slit 27.

In addition, it is not necessary to increase the width of slit 27 in order to prevent an electrical short circuit assuming a conductive foreign matter that can enter between one end surface 33*c* and other end surface 33*c*, and it is possible to simplify the setting (design) of the width of slit 27 in metal base body 33 when metal base substrate 31 is designed.

In coil device 20, sealing member 73 may be filled in box-shaped cooling body 39 such that substantially entire core 21 is sealed by sealing member 73. In this case, the heat generated in core 21 is dissipated to cooling body 39 via sealing member 73. Consequently, this eliminates the need for increasing the size of core 21 for heat dissipation, and can further contribute to the miniaturization of coil device 20 and eventually, to the miniaturization of power conversion device 1.

In addition, wiring member 41 is mechanically fixed to metal base substrate 31 by sealing member 73. As a result, vibration resistance of coil device 20 and thus vibration resistance of power conversion device 1 can be improved.

Second Embodiment

Figure 31:
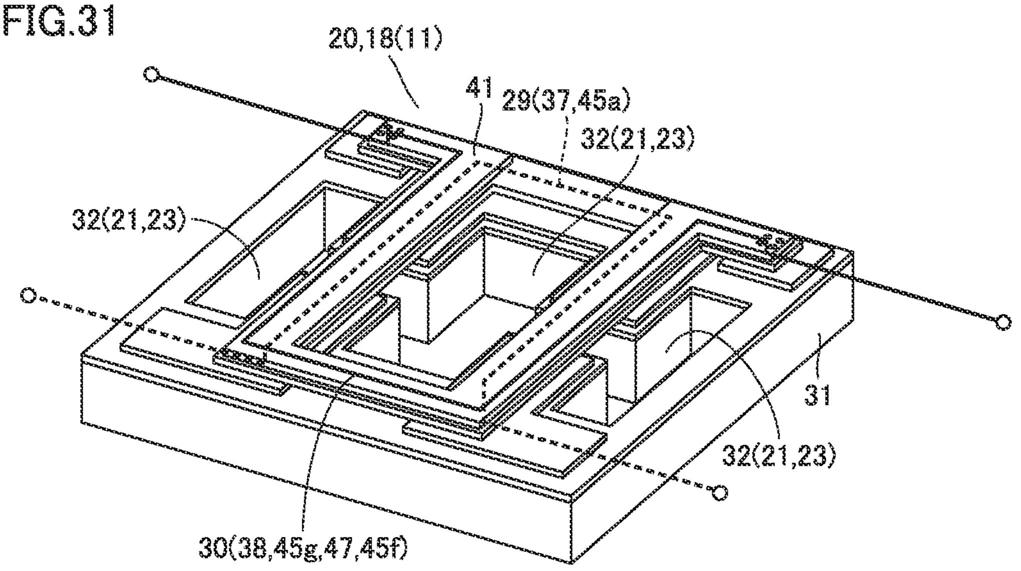
FIG. 31 is a perspective view for describing an example of a coil device according to a second embodiment.

In a second embodiment, a transformer will be described as another example of the coil device. As illustrated in FIG. 31, transformer 11 as coil device 20 is formed by core 21 (see FIG. 2) and first winding part 29 and a second winding part 30 which are wound around core 21. First winding part 29 and second winding part 30 are electrically insulated from each other.

Figure 32:
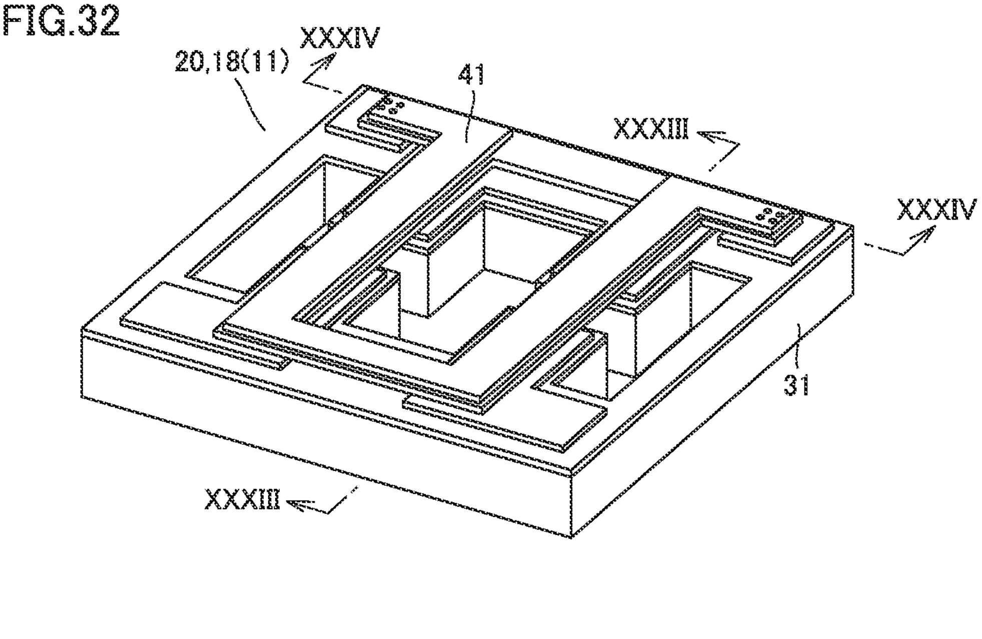
FIG. 32 is a perspective view of the coil device in the second embodiment.
Figure 33:
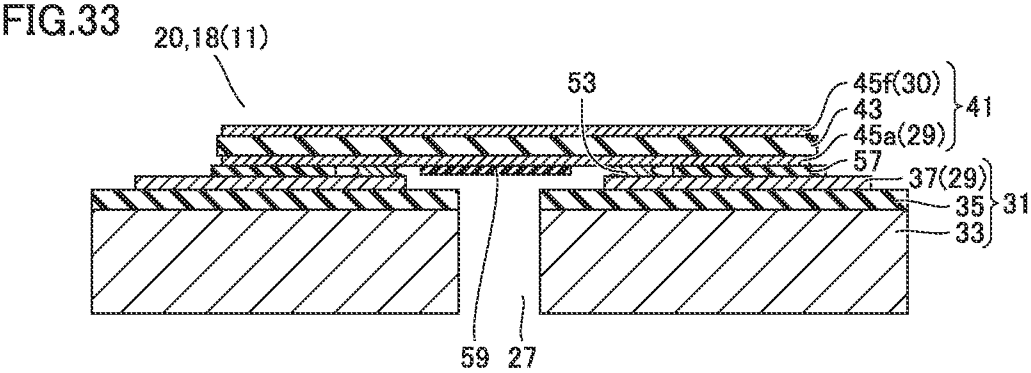
FIG. 33 is a sectional view taken along a sectional line XXXIII-XXXIII in FIG. 32 in the second embodiment.
Figure 34:
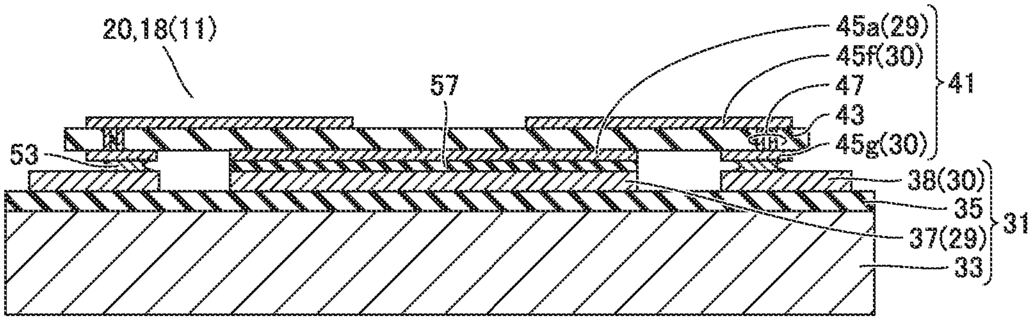
FIG. 34 is a sectional view taken along a sectional line XXXIV-XXXIV in FIG. 32 in the second embodiment.

As illustrated in FIGS. 32, 33, and 34, first winding part 29 includes coil pattern 37 in metal base substrate 31 and wiring body 45*a* in wiring member 41. Second winding part 30 includes a coil pattern 38 in metal base substrate 31 and a wiring body 45*g* and a wiring body 45*f* in wiring member 41.

Coil pattern 37 and coil pattern 38 are formed with insulating layer 35 interposed on metal base body 33. Wiring body 45*a* (first winding part 29) and wiring body 45*g* (second winding part 30) are formed on a side of insulating part 43 facing coil patterns 37 and 38. Wiring body 45*f* (second winding part 30) is formed on a side of insulating part 43 opposite to the side facing coil patterns 37 and 38.

Wiring body 45*a* and coil pattern 37 are electrically connected to each other by bonding member 53. Wiring body 45*f* and wiring body 45*g* are electrically connected to each other by through hole conductive part 47. Wiring body 45*g* and coil pattern 38 are electrically connected to each other by bonding member 53. Note that the other configurations are similar to those of coil device 20 illustrated in FIG. 2 and the like, and thus, the same members are denoted by the same reference signs, and the description thereof will not be repeated unless necessary.

In coil device 20 described above, first winding part 29 including coil pattern 37 and wiring body 45*a* becomes primary winding 11*a* (or secondary winding 11*b*) of transformer 11, and second winding part 30 including coil pattern 38 and wiring bodies 45*g* and 45*f* becomes secondary winding 11*b* (or primary winding 11*a*) of transformer 11.

Heat generated in the portion of first winding part 29 (coil pattern 37, wiring body 45*a*) and the portion of second winding part 30 (coil pattern 38, wiring body 45*f*, wiring body 45*g*) located in the outer region of core 21 is dissipated to cooling body 39 via insulating layer 35 and metal base body 33.

Heat generated in the portion of first winding part 29 (coil pattern 37, wiring body 45*a*) and the portion of second winding part 30 (coil pattern 38, wiring body 45*f*, wiring body 45*g*) located in the inner region of core 21 is also dissipated to cooling body 39 via insulating layer 35 and metal base body 33.

As a result, the heat generated in each of the portion of first winding part 29 and the portion of second winding part 30 located in the inner region of core 21 is dissipated to cooling body 39 to the same extent as the heat generated in each of the portion of first winding part 29 and the portion of second winding part 30 located in the outer region of core 21. Consequently, this eliminates the need for increasing the size coil pattern 37 of first winding part 29, coil pattern 38 of second winding part 30 for heat dissipation, and the like, and can contribute to the miniaturization of coil device 20 and eventually, to the miniaturization of power conversion device 1.

For example, when the voltage of first winding part 29 is higher than the voltage of second winding part 30, the current flowing through second winding part 30 is larger than the current flowing through first winding part 29, and thus, the heating value of second winding part 30 is relatively large. Therefore, second winding part 30 is preferably disposed closer to metal base body 33, and is preferably disposed on the upper surface of the insulating part 43 in order to more reliably and electrically insulate first winding part 29 having a relatively high voltage.

In coil device 20 described above, a case where each of first winding part 29 and second winding part 30 is wound once around leg 23*c* (see FIG. 2) of E-shaped core 23 (the number of windings is one (one turn)) has been taken as an example. In addition, one printed circuit board has been exemplified as wiring member 41 on which wiring bodies 45*a*, 45*f*, and 45*g* are formed.

The number of windings of each of first winding part 29 and second winding part 30 may be two or more, as necessary. In order to increase the number of windings of each of first winding part 29 and second winding part 30, a wiring member in which two or more printed circuit boards are laminated may be applied as wiring member 41. As described above, in the wiring member in which two or more printed circuit boards are laminated, one printed wiring board and the other wiring board are electrically connected to each other by a bonding member. Furthermore, a multi-layer printed circuit board in which a wiring body (conductive layer) and an insulating part are alternately laminated may be applied.

If the number of windings of each of first winding part 29 and second winding part 30 increases, it is sufficient to laminate a printed circuit board or the like, and there is no need to increase the size of metal base substrate 31. As a result, it is possible to contribute to the miniaturization of coil device 20, and eventually, to the miniaturization of power conversion device 1.

Third Embodiment

Figure 35:
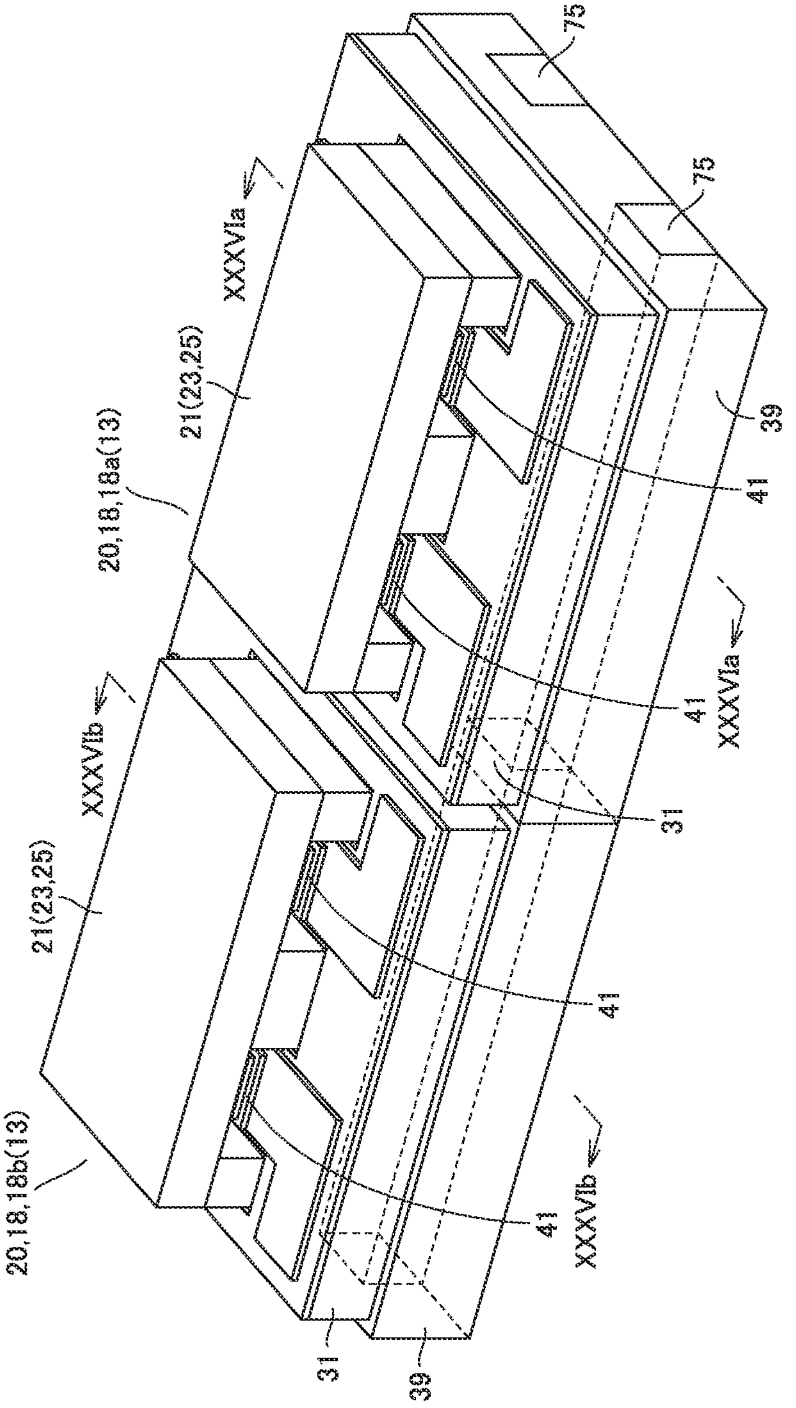
FIG. 35 is a perspective view illustrating an example of a coil device according to a third embodiment.
Figure 36:
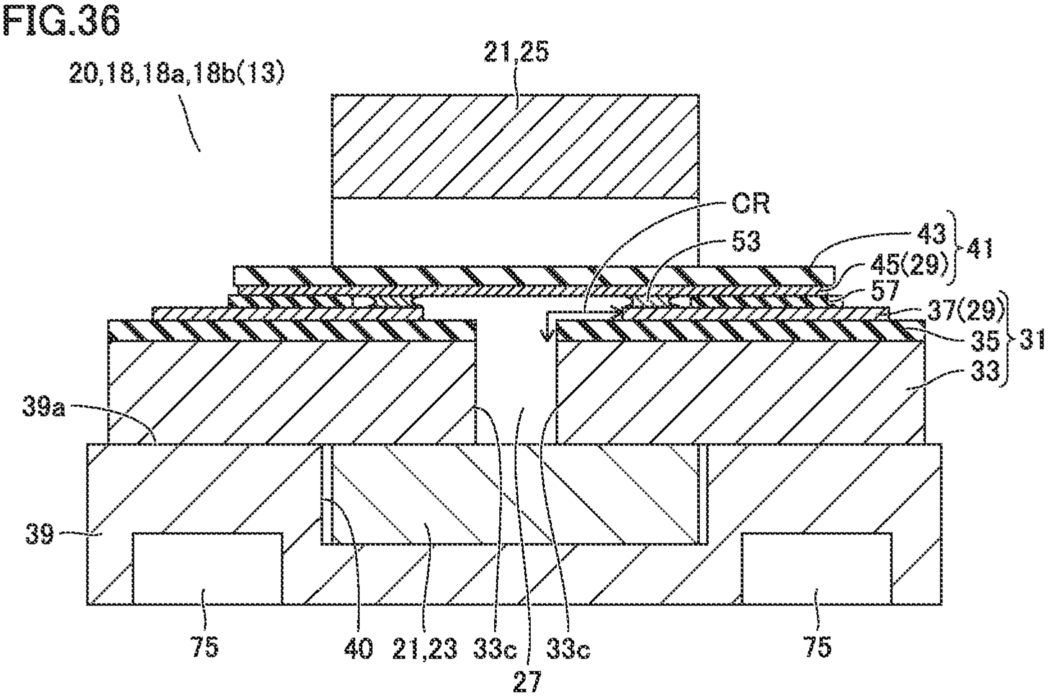
FIG. 36 is a sectional view taken along a sectional line XXXVIa-XXXVIa or a sectional line XXXVIb-XXXVIb in FIG. 35 in the third embodiment.

In a third embodiment, a coil device including two coil units will be described as still another example of the coil device. As illustrated in FIGS. 35 and 36, coil device 20 includes a first coil unit 18*a* and a second coil unit 18*b* as coil unit 18.

Coil device 20 including first coil unit 18*a* and coil device 20 including second coil unit 18*b* are disposed adjacent to each other. One coil device 20 (first coil unit 18*a*) and other coil device 20 (second coil unit 18*b*) may be electrically connected to each other in series or electrically connected to each other in parallel.

A heat diffusion member 75 as a first heat diffusion member is disposed in cooling body 39 in one coil device 20. A heat diffusion member 75 as a second heat diffusion member is disposed in cooling body 39 in other coil device 20. As heat diffusion member 75, for example, a heat pipe or a vapor chamber can be applied.

Heat diffusion member 75 may include, for example, a material having a thermal conductivity of 300 W/m· K or more.

As indicated by a dotted line, heat diffusion member 75 in one coil device 20 and heat diffusion member 75 in other coil device 20 are connected to each other. Heat diffusion member 75 is continuously formed from cooling body 39 of one coil device 20 to cooling body 39 of other coil device 20. In order to avoid complication of the drawing, the dotted line is illustrated for heat diffusion member 75 on the front side.

When both coil devices 20 of one coil device 20 and other coil device 20 operate, the temperature of coil devices 20 rises with heat generation of the coil or the core. When the temperature of coil devices 20 rises, the core tends to be magnetically saturated. In addition, the electric resistivity of the coil tends to increase. Therefore, it is assumed that the electrical characteristics of coil devices 20 change.

In coil device 20 described above, heat diffusion member 75 is continuously formed from cooling body 39 of one coil device 20 to cooling body 39 of other coil device 20. Accordingly, it is possible to reduce the difference between the temperature rise of one coil device 20 and the temperature rise of other coil device 20. As a result, it is possible to suppress an unstable operation of coil device 20 due to an increase in the difference in temperature rise, and it is possible to suppress a malfunction of power conversion device 1 including coil device 20.

In general, when the difference between the temperature rise of one coil device and the temperature rise of the other coil device is large, the allowable temperature is determined by the coil device having a larger temperature rise. Therefore, a structure for cooling the coil device having a larger temperature rise is required, and it is assumed that the coil device is increased in size.

In coil device 20 described above, the difference between the temperature rise of one coil device 20 and the temperature rise of other coil device 20 is reduced by heat diffusion member 75, and the heat can be equalized. As a result, it is possible to suppress an increase in size of the coil device due to an increase in the difference in temperature rise, and it is possible to contribute to the miniaturization of power conversion device 1 including coil device 20.

Figure 37:
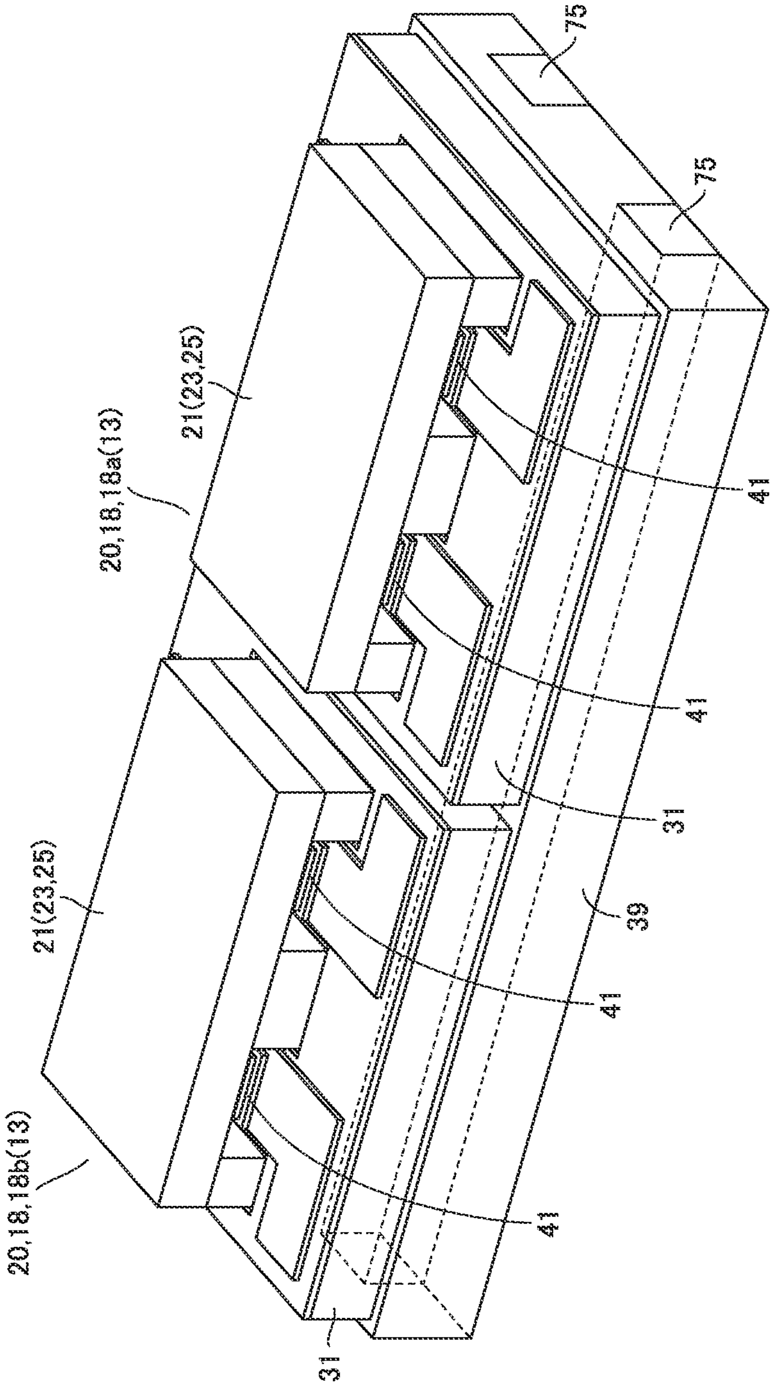
FIG. 37 is a perspective view illustrating an example of a coil device according to a modification in the third embodiment.

In coil device 20 described above, a case where cooling body 39 is disposed in each of one coil device 20 and other coil device 20 has been described as an example. As illustrated in FIG. 37, as cooling body 39 in coil device 20, integrally formed cooling body 39 may be applied to entire one coil device 20 and other coil device 20.

Note that the coil device and the power conversion device described in each embodiment can be variously combined as necessary.

The embodiments disclosed herein are only by way of example, and not restrictive. The present disclosure is defined not by the scope of the above description but by the claims, and is intended to include meanings equivalent to the claims and all modifications within the scope.

INDUSTRIAL APPLICABILITY

The present disclosure is effectively used in a coil device in which a winding part is wound around a core.

REFERENCE SIGNS LIST

1: power conversion apparatus, 2: inverter circuit unit, 3: transformation unit, 4: rectifier circuit unit, 5: smoothing circuit unit, 6: input terminal, 7: output terminal, 8: input capacitor, 9, 9*a*, 9*b*, 9*c*, 9*d*: switching element, 10: control circuit unit, 11: transformer, 11*a*: primary winding, 11*b*: secondary winding, 12, 12*a*, 12*b*: rectifier element, 13: smoothing reactor, 14: smoothing capacitor, 18, 18*a*, 18*b*: coil unit, 20: coil device, 21: core, 23: E-shaped core, 23*a*, 23*b*, 23*c*: leg, 23*d*: through hole, 23*ac*, 23*bc*: surface, 25: I-shaped core, 25*a*: through hole, 27: slit, 29: first winding part, 30: second winding part, 31: metal base substrate, 32: through hole, 33: metal base body, 33*a*: first main surface, 33*b*: second main surface, 33*c*: end surface, 34*a*, 34*b*: metal base body, 35: insulating layer, 35*a*: first main surface, 35*b*: second main surface, 37: coil pattern, 37*a*: wiring pattern, 38: coil pattern, 39: cooling body, 39*a*: main surface, 40: groove, 41: wiring member, 43, 43*a*, 43*b*: insulating part, 45, 45*a*, 45*b*: wiring body, 45*c*: conductive part, 45*d*, 45*e*: metal bus bar, 45*f*: wiring body, 47, 49: through hole conductive part, 53, 55: bonding member, 57: heat conducting member, 59: insulating member, 61: fixing tape, 63*a*,

63*b*: heat conducting member, 65: pressing member, 65*a*: flat member, 65*b*: leaf spring-like member, 65*c*: T-shaped member, 65*cc*: protrusion, 65*cca*: end surface, 67: strut, 69: heat conducting member, 71: short circuit preventing member, 73: sealing member, RP, RP1, RP2, RP3: induced current, TA, TB: terminal, CR: creepage distance, P1, P2, P3, P4, P5, P6, P10, P11, P12, P13, P14, P15: position.

The invention claimed is:

1. A coil device having one or more coil units, wherein the one or more coil units include a core having one or more loop-shaped magnetic paths, and a first winding part wound around the core so as to pass through an inner region of the core surrounded by the core, a metal base substrate in which a coil pattern is formed with an insulating layer interposed on a metal base body is disposed in the inner region of the core and an outer region of the core, a first through hole through which the core passes is formed in the metal base substrate, the metal base substrate is disposed to surround the core from the inner region and the outer region of the core in such a manner that a slit that divides the core so as not to continuously surround the core is formed, the slit is formed so as to be connected to the first through hole, and the first winding part includes the coil pattern.

2. The coil device according to claim 1, wherein a wiring member to electrically connect the coil pattern formed in a portion of the metal base substrate located on one side across the slit and the coil pattern formed in a portion of the metal base substrate located on another side across the slit is disposed, the wiring member including a wiring body, and the first winding part includes the wiring body in the wiring member.

3. The coil device according to claim 1, wherein the slit is disposed in the inner region of the core.

4. The coil device according to claim 2, wherein the wiring member includes an insulating part, and the wiring body is disposed in the insulating part.

5. The coil device according to claim 2, wherein the wiring member is a printed circuit board, and the wiring body is disposed on the printed circuit board.

6. The coil device according to claim 2, wherein the wiring body in the wiring member and the coil pattern formed on the metal base substrate are electrically connected to each other by a bonding member.

7. The coil device according to claim 2, wherein the metal base substrate and the wiring member are thermally coupled to each other with a first heat conducting member interposed between the metal base substrate and the wiring member.

8. The coil device according to claim 2, wherein an insulating member is disposed between a portion of the wiring member facing the slit and the slit.

9. The coil device according to claim 2, wherein a short circuit preventing member is disposed between an end surface of the metal base substrate located on the one side across the slit and an end surface of the metal base substrate located on the another side across the slit.

10. The coil device according to claim 2, wherein the wiring member includes a bent wiring body bent in a direction away from the metal base substrate.

11. The coil device according to claim 2, wherein the metal base substrate and the wiring member are sealed by a sealing member.

12. The coil device according to claim 1, wherein a second heat conducting member is interposed between the core inserted into the first through hole formed in the metal base substrate and the metal base substrate.

13. The coil device according to claim 12, wherein the metal base body in the metal base substrate has a first main surface and a second main surface facing each other, the coil pattern is formed on the first main surface, and the second main surface of the metal base body and the core are thermally bonded to each other with the second heat conducting member interposed between the second main surface of the metal base body and the core.

14. The coil device according to claim 1, wherein a cooling body is thermally bonded to a side of the metal base body opposite to a side where the insulating layer and the coil pattern are formed, and the coil device further comprises:

a strut thermally bonded to the cooling body and disposed so as to protrude from the cooling body toward a side where the core is disposed; and a pressing member fixed to the strut to be thermally bonded to the strut so as to cover the core, the pressing member pressing the core toward a side where the cooling body is located.

15. The coil device according to claim 14, wherein a third heat conducting member is interposed between the core and the pressing member.

16. The coil device according to claim 14, wherein the pressing member includes a protrusion that protrudes toward the cooling body and is thermally bonded to the cooling body, and a second through hole through which the protrusion is inserted is formed in the core.

17. The coil device according to any claim 1, further comprising a second winding part wound around the core so as to pass through the inner region of the core, the second winding part being electrically insulated from the first winding part.

18. The coil device according to claim 2, further comprising a second winding part wound around the core so as to pass through the inner region of the core, the second winding part being electrically insulated from the first winding part, wherein the first winding part and the second winding part electrically insulated from each other are disposed in the wiring member.

19. The coil device according to claim 1, wherein a cooling body is thermally bonded to a side of the metal base body opposite to a side where the insulating layer and the coil pattern are formed, the one or more coil units include a first coil unit and a second coil unit, the first coil unit and the second coil unit are disposed so as to be adjacent to each other, and a first heat diffusion member is disposed in the cooling body in the first coil unit, a second heat diffusion member is disposed in the cooling body in the second coil unit, and the first heat diffusion member and the second heat diffusion member are disposed so as to be connected to each other.

20. A power conversion device comprising the coil device according to claim 1.

* * * * *